(12) United States Patent
Tatourian et al.

(10) Patent No.: US 10,200,725 B2
(45) Date of Patent: Feb. 5, 2019

(54) ADAPTIVE DATA STREAMING BASED ON VIRTUAL SCREEN SIZE

(71) Applicant: Intel Corporation, Santa Clara, CA (US)

(72) Inventors: Igor Tatourian, Fountain Hills, AZ (US); Hong Li, El Dorado Hills, CA (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 14/739,790

(22) Filed: Jun. 15, 2015

(65) Prior Publication Data

US 2016/0366454 A1 Dec. 15, 2016

(51) Int. Cl.
| | |
|---|---|
| *H04N 21/2343* | (2011.01) |
| *H04N 21/658* | (2011.01) |
| *H04N 21/6373* | (2011.01) |
| *H04N 21/239* | (2011.01) |
| *H04N 21/258* | (2011.01) |

(Continued)

(52) U.S. Cl.
CPC ....... *H04N 21/234345* (2013.01); *G06F 3/14* (2013.01); *G09G 5/391* (2013.01); *H04N 21/2393* (2013.01); *H04N 21/234363* (2013.01); *H04N 21/25825* (2013.01); *H04N 21/44218* (2013.01); *H04N 21/4516* (2013.01); *H04N 21/4532* (2013.01); *H04N 21/6373* (2013.01); *H04N 21/6582* (2013.01); *G09G 2370/022* (2013.01)

(58) Field of Classification Search
CPC . H04L 65/4092; H04L 67/303; H04L 67/306; G06F 3/14; G06F 3/017; G09G 2340/0407; G09G 5/373; H04N 21/2343; H04N 21/234345; H04N 21/2385; H04N 21/23463; H04N 21/44218; H04N 21/6373; H04N 21/6377; H04N 21/658; H04N 5/225; G06T 2200/16; G06T 2200/28; G06T 3/4092
See application file for complete search history.

(56) References Cited

U.S. PATENT DOCUMENTS

| | | | |
|---|---|---|---|
| 2010/0016014 A1* | 1/2010 | White | H04M 1/22 455/556.1 |
| 2011/0088039 A1* | 4/2011 | Tabone | G06F 17/30097 718/104 |

(Continued)

*Primary Examiner* — Hai V Tran
(74) *Attorney, Agent, or Firm* — Schwabe, Williamson & Wyatt, P.C.

(57) ABSTRACT

Methods, systems, and storage media are described for adjusting a bitrate for a data stream according to user consumption of the data stream. In embodiments, a computing device may determine a virtual resolution based on an absolute resolution of a display device associated with the computing device and a relative display size of the display device. The relative display size may be based on a user position and an absolute display size of the display device. The computing device may request data stream segments of a data stream encoded at a bitrate based on the virtual resolution, and provide the data stream segment for display on the display device. The virtual resolution may also be based on user attributes and/or device attributes. Other embodiments may be described and/or claimed.

28 Claims, 5 Drawing Sheets

(51) Int. Cl.
*H04N 21/442* (2011.01)
*G06F 3/14* (2006.01)
*H04N 21/45* (2011.01)
*G09G 5/391* (2006.01)

(56) References Cited

U.S. PATENT DOCUMENTS

| | | | |
|---|---|---|---|
| 2013/0007831 A1* | 1/2013 | Wu | H04N 21/23655 725/116 |
| 2013/0195204 A1* | 8/2013 | Reznik | H04N 19/85 375/240.26 |
| 2013/0201423 A1* | 8/2013 | Rawer | G02F 1/133382 349/61 |
| 2014/0118354 A1* | 5/2014 | Pais | G09G 5/373 345/428 |
| 2014/0179266 A1* | 6/2014 | Schultz | H04W 4/24 455/406 |
| 2015/0304390 A1* | 10/2015 | Chakarapani | H04L 43/10 709/217 |

* cited by examiner

ADAPTIVE DATA STREAMING BASED ON VIRTUAL SCREEN SIZE

FIELD

The present disclosure relates to the field of data communications, and in particular, to apparatuses, methods and storage media associated with adapting and/or adjusting bitrates for data streams based on user context.

BACKGROUND

As computing devices become more prevalent, and as more devices become connected to the internet, network throughput and/or bitrate optimization is becoming more important. Most throughput and/or bitrate optimization technologies are implemented on the network operator's end, such as by optimizing the physical network design and/or network topology or by optimizing how data flows to network consumers. However, most throughput and/or bitrate optimization technologies are not implemented at the network consumer's end.

Additionally, most network consumers are usually offered a subscription or data plan that is expressed as a maximum data transfer rate in bits per second. For example, when a user subscribes to a 100 Megabit per second (Mbps) plan, not only does the user often get a lower data transfer rate, especially during peak usage times, but the subscription usually does not guarantee lagless or seemingly delay free data streaming. The reasons for this are based on the physical network design and/or network topology. For example, various cables and/or wires used to communicate data have a finite length and diameter, which limits the amount of data that may be transferred over the cables and/or wires. Furthermore, with wireless networks, network congestion and/or environmental factors often limit the amount of data that may be transferred to a computing device. Current techniques for mitigating network congestion or otherwise allocating network resources include the use of complex algorithms for managing traffic, such as monitoring traffic types, shifting network resources between subscribers, prioritizing the allocation of network resources to traffic types that are more sensitive to delays, and/or collision avoidance schemes.

However, the current techniques for mitigating network congestion or otherwise allocating network resources do not typically account for a user's experience and/or interaction with user context when adjusting or allocating network resources.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
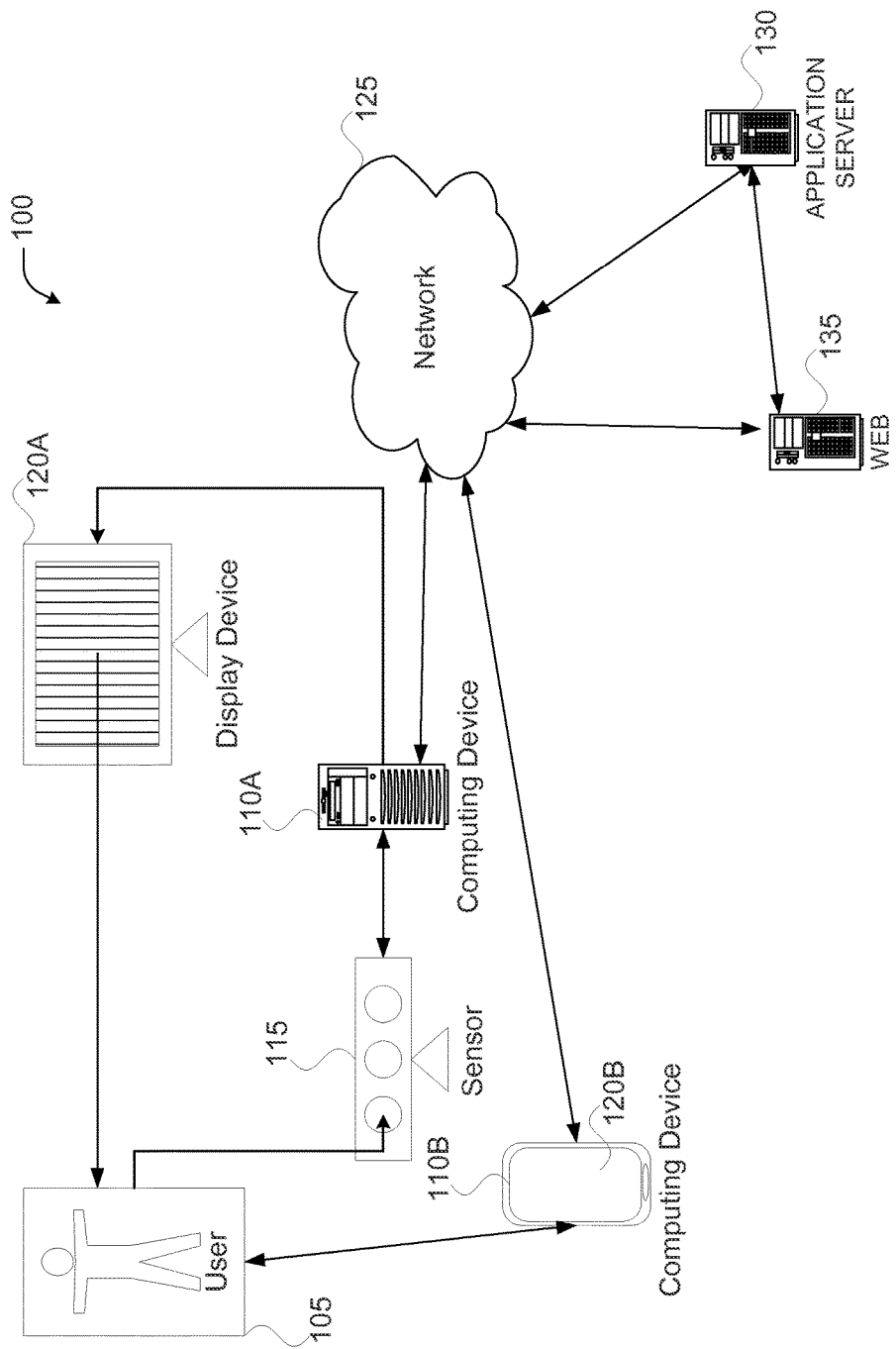
FIG. 1 illustrates a communications network in which various example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural and/or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions and/or operations in turn, in a manner that is most helpful in understanding the claimed subject matter. However, the order of description should not be construed to imply that the various operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For the purposes of the present disclosure, the phrase "at least one of A and B" means (A), (B), or (A and B).

The description may use the phrases "in an embodiment", or "in embodiments", which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "mobile device" may be considered synonymous to, and may hereafter be occasionally referred to, as a client, mobile, mobile unit, mobile terminal, mobile station, mobile user, user equipment (UE), user terminal, subscriber, user, remote station, access agent, user agent, receiver, etc., and may describe a remote user of network resources in a communications network. Furthermore, the term "mobile device" may include any type of wireless device such as consumer electronics devices, smart phones, tablet personal computers, wearable computing devices, personal digital assistants (PDAs), laptop computers, and/or any other like physical computing device that is able to connect to a communications network.

As used herein, the term "network element", may be considered synonymous to and/or referred to as a networked computer, networking hardware, network equipment, router, switch, hub, bridge, gateway, and/or other like device. The term "network element" may describe a physical computing device of a wired or wireless communication network that is configured to host a client device and the like. Furthermore, the term "network element" may describe equipment that provides radio baseband functions for data and/or voice connectivity between a network and one or more users.

Example embodiments disclosed herein provide systems and methods for adjusting a bitrate for segments of a data stream based on user contexts, such as user actions and/or device attributes. Example embodiments introduce a concept of a "virtual display size", "virtual screen", and/or "virtual resolution" that is used to obtain segments of a data stream instead of using an actual or absolute display size and/or actual or absolute display resolution of a display device. The example embodiments differ from typical systems that provide content at a maximum allowable/available resolution because the typical systems assume that users or network subscribers are always consuming (or attempting to consume) content under defined display conditions and/or at a maximum attention span/focus level. Streaming content at a maximum allowable/available resolution usually requires selecting a highest available bitrate for a data stream, such as in systems implementing dynamic adaptive streaming over HTTP (DASH) (also referred to as "MPEG-DASH"). MPEG-DASH is a bitrate streaming technique that breaks a data stream into a sequence of small HTTP-based data segments that are encoded at a variety of different bitrates, wherein a streaming client automatically selects a next data stream segment to download and play back based on current network conditions experienced by the streaming client. Using MPEG-DASH, the client selects a data stream segment with a highest bitrate possible that can be downloaded in time for play back without causing lags or buffering events in the playback. However, MPEG-DASH and other like dynamic adaptive streaming techniques assume that an end user is always concentrating on the streaming content and always desires the highest resolution to be displayed on his/her device regardless of the size of the display device, viewing distance, and/or other user contexts that may impact the need on how the content is displayed. Thus, using typical dynamic adaptive streaming techniques, content is streamed or downloaded at a maximum allowable bitrate. Network resources may be strained when data streams are required to be provided to multiple network subscribers at the maximum available bitrate (especially at peak network usage times). This may require network operators to manage traffic according to current or predicted network conditions on the backend. By contrast, example embodiments allow content to be obtained according to a virtual screen size and/or a virtual resolution that is based on user focus and/or attention level, as well as other user interactions with a computing device and/or a display device (i.e., on the frontend). Accordingly, the example embodiments allow for streaming bitrates to be reduced or increased according to a user's focus/attention level, and/or according to whether the user is present or absent from a viewing area of a display device, which may provide network resource utilization efficiencies. Furthermore, the example embodiments may be implemented without altering the already existing backend network congestion mitigation technologies, and thus, the example embodiments may provide additional network resource utilization efficiencies when used in conjunction with already existing network infrastructure.

In various embodiments, the virtual resolution is based on an actual display size and/or actual resolution and a distance between the user and the display device. In some embodiments, the virtual resolution may take into account the user's viewing angle, which is an angle of the user relative to the display device. In various embodiments, the virtual resolution may account for user preferences such as desired content types, specified user activities and/or user gestures, ambient lighting levels, background noise levels, and/or other contexts of content consumption (referred to herein as "user contexts"). Furthermore, in various embodiments, tile rendering (or "tiling") may be used to provide one or more portions of a video frame at a higher bitrate (i.e., better clarity) than other portions of the video frame based on the user's gaze or focus on region of the display device. Moreover, in various embodiments, the presence of multiple devices and their associated data plans or remaining data budget may be detected, and streaming may be switched to a device that is associated with a best data plan or highest remaining data budget. The invention may utilize one or more sensors associated with the display device (e.g., a camera of a smart phone, a webcam of a laptop, a motion detection device of a videogame console, etc.) to determine the distances, angles, gestures, etc.

Referring now to the figures. FIG. 1 shows a communications network 100 in which bitrates for data streams may be adjusted based on user context of a given user (e.g., user 105), in accordance with various embodiments. As shown in FIG. 1, communications network 100 may include user 105, computing devices 110A and 110B (collectively referred to as "computing devices 110"), sensor 115, display device 120A, network 125, application server 130, and web server 135. Additionally, computing device 110B may include display device 120B.

User 105 may be a person or entity that employs services provided by a network operator. The user 105 may also be referred to as a subscriber, network subscriber, customer, network consumer, and the like. The network operator may be an internet service provider (ISP) and/or a provider of wireless telecommunications services. For purposes of the example embodiments described herein, the user 105 may represent a final destination of a data stream or content provided by a content provider (e.g., an operator of application server 130).

Computing devices 110 may be physical hardware computing devices capable of communicating with a one or more other hardware computing devices (e.g., sensor 115, display device 120, other computing devices 110, application server 130, web server 135, one or more associated databases (not shown), and the like) via a communications interface, such that computing device 110 is able to receive one or more signals and/or data streams from the other hardware computing devices. Computing device 110 may include one or more memory devices and one or more processors. Computing devices 110 may be designed to sequentially and automatically carry out a sequence of arithmetic or logical operations; equipped to record/store digital data on a machine readable medium; and transmit and receive digital data via one or more network devices. Computing device 110A may include substantially stationary computing devices such as desktop personal computers (PC), desktop replacement laptop PCs, video game consoles, digital media players, home servers, and/or the like. Computing device 110B may include mobile computing devices, such as laptop PCs, smart phones, tablet personal computers, wearable computing devices, in-vehicle infotainment (IVI) and/or in-car entertainment (ICE) devices, a handheld messaging device, a personal data assistant, an electronic book reader, an augmented reality device, and the like. It should be noted that each of the computing devices 110 may be any physical or logical device capable of recording, storing, and/or transferring digital data via a connection to a network element.

In various embodiments, the computing devices 110 may include a network interface (e.g., network interface 330 described with regard to FIG. 3) configured to connect computing device 110 to one or more other hardware computing devices wirelessly via a transmitter and a receiver (or optionally a transceiver) and/or via a wired connection using a communications port. Computing devices 110 may be configured to send/receive data to/from one or more other hardware computing devices, and/or network devices, such as a router, switch, hub, or other like network devices, via the network interface using the wired connection and/or the wireless connection. Computing devices 110 may be configured to obtain a data stream from a network element (e.g., web server 135) via the network interface, and provide the data stream to be displayed on a display device (e.g., display device 120) via an input/output (I/O) interface (e.g., I/O interface 340 discussed with regard to FIG. 3). The computing devices 110 may include a transmitter/receiver (or alternatively, a transceiver) configured to send/receive data to/from a network element (e.g., application server 130, etc.) via a wireless network connection. In such embodiments, computing devices 110 may communicate over the network 125 in accordance with one or more wireless communications protocols and/or one or more cellular phone communications protocols. For example, computing device 110B may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, Long Term Evolution (LTE), and/or any other "wireless" communication protocols, including RF-based, optical, and so forth.

In various embodiments, computing device 110B may be equipped with location (or alternatively "geolocation"), positioning, and/or navigation circuitry, such as a Global Positioning System ("GPS") receiver, as well as software to convert received GPS signals into a location and/or position (within some margin of error). In various embodiments, alternate positioning systems may be employed, such as wireless network signal-strength-based indoor positioning system (IPS), hybrid systems combining global and local positioning systems, and/or other like positioning and/or location detection systems. However, in various embodiments, geolocation and/or positioning information may come from other sources including an IP address, Wi-Fi and/or Bluetooth MAC address, radio-frequency identification ("RFID"), Wi-Fi connection location, GSM/CDMA cell IDs, and the like. Furthermore, computing device 110B may include an accelerometer, gyroscope, magnetometer, gravimeter, and/or another like device that is configured to measure and/or detect motion, acceleration, and/or an orientation of the computing device 110B. In such embodiments, the computing device 110B may be configured to determine a magnitude and direction of an acceleration and/or motion of the computing device 110B, and convert the acceleration and/or motion of the computing device 110B into position and/or orientation information.

Computing devices 110 may be configured to run, execute, or otherwise operate one or more applications. In some embodiments, an application may be developed by a content provider (e.g., an operator of application server 130) so that the computing devices 110 may consume content provided by the content provider. With regard to computing device 110B, the applications may include native applications, web applications, and hybrid applications. The native applications may be used for operating the computing device 110B, such as using a camera or other like sensor of the computing device 110B, GPS functionality of the computing device 110B, an accelerometer of the computing device 110B, cellular phone functionality of the computing device 110B, and other like functions of the computing device 110B. Native applications may be platform or operating system (OS) specific. Native applications may be developed for a specific platform using platform-specific development tools, programming languages, and the like. Such platform-specific development tools and/or programming languages may be provided by a platform vendor. Native applications may be pre-installed on computing device 110B during manufacturing, or provided to the computing device 110B by an application server (e.g., application server 130) via a network (e.g. network 125). Web applications are applications that load into a web browser of the computing device 110B in response to requesting the web application from a service provider (e.g., web server 135). The web applications may be websites that are designed or customized to run on a mobile device by taking into account various mobile device parameters, such as resource availability, display size, touchscreen input, and the like. In this way, web applications may provide an experience that is similar to a native application within a web browser. Web applications may be any server-side application that is developed with any server-side development tools and/or programming languages, such as PHP, Node.js, ASP.NET, and/or any other like technology that renders HTML. Hybrid applications may be a hybrid between native applications and web applications. Hybrid applications may be a standalone, skeletons, or other like application containers that may load a website within the application container. Hybrid applications may be written using website development tools and/or programming languages, such as HTML5, CSS, JavaScript, and the like. Hybrid applications use browser engine of the computing device 110B, without using a web browser of the computing device 110B, to render a website's services locally. Hybrid applications may also access mobile device capabilities that are not accessible in web applications, such as the accelerometer, camera, local storage, and the like. Although the previous discussion pertains to computing device 110B, it should be noted that in various embodiments, the same or similar applications may be operated by computing device 110A.

Sensor 115 may be any device that senses, detects, captures, measures or otherwise obtains a position and/or an orientation of an object and converts the sensed position and/or orientation into a signal and/or sensor data, which can be read by a computing device (e.g., computing device 110A and/or computing device 110B). In various embodiments, sensor 115 may be configured to record and/or store the sensed position and/or orientation as position information (or alternatively "position data") and/or orientation information (or alternatively "orientation data"). Once the position information and/or orientation information is sensed and recorded, such position information and/or orientation information may be reported or otherwise transmitted to computing device 110A and/or computing device 110B for adjusting a bitrate associated with a data stream being provided by a content provider (e.g., web server 135 and/or application server 130). Sensor 115 may also be configured to receive data requests and/or control data from computing device 110A and/or computing device 110B.

In various embodiments, sensor 115 may include one or more motion capture devices that may be configured to capture motion by detecting a change in position of a body (e.g., user 105) relative to its surroundings (e.g., one or more objects surrounding the user 105), or by detecting a change in the surroundings relative to the body. In such embodiments, sensor 115 may be configured to measure the strength and/or speed of a body's motion. In various embodiments, motion may be detected by sound, opacity, reflection of transmitted electromagnetic energy (i.e., light), and/or other like means of detecting motion. In various embodiments, sensor 115 may include one or more optical cameras and/or one or more thermographic (infrared) cameras, which may be configured to form images using infrared radiation. Such infrared cameras may be similar to optical-lens cameras, which form images using visible light, but instead operate in wavelengths in the infrared range of the electromagnetic spectrum. In embodiments where sensor 115 includes one or more infrared cameras, sensor 115 may also include an infrared projector and/or infrared laser projector, which may be configured to project an infrared beam at one or more targets, such as one or more portions of the user 105 and/or one or more objects surrounding the user 105. The one or more infrared cameras may be configured to sense a reflection of the infrared beam being reflected off the one or more targets.

In various embodiments, sensor 115 may also include a network interface configured to connect sensor 115 to one or more other hardware computing devices (e.g., computing device 110) wirelessly via a transmitter and a receiver (or optionally a transceiver) and/or via a wired connection using a communications port. The wireless transmitter/receiver and/or transceiver may be configured to operate in accordance with one or more wireless communications standards in a same or similar manner as discussed with regard to computing devices 110, and the communications port may be configured to operate in accordance with one or more wired communications protocol in a same or similar manner as discussed with regard to computing devices 110.

Display devices 120A and 120B (collectively referred to as "display devices 120") may be any type of output device that is able to present information in a visual form based on received electrical signals. Display devices 120 may be a light-emitting diode (LED) display device, an organic LED (OLED) display device, a liquid crystal display (LCD) device, a quantum dot display device, a projector device, and/or any other like display device. Furthermore, in various embodiments, the display device 120B may be a touchscreen input device wherein the user 105 may provide one or more inputs to the computing device 110B through one or more gestures by touching the display device 120B with a stylus/pen and/or one or more fingers. The aforementioned display device technologies are generally well known, and a description of the functionality of the display devices 120 is omitted for brevity.

As shown in FIG. 1, the display device 120A may be separate from the computing device 110A, while the display device may be embedded with the computing device 110B. Display device 120 may be coupled with the computing device 110A by way of a wired connection, such as RCA connectors, a video graphics array (VGA) connector, a digital visual interface (DVI) connector and/or mini-DVI connector, a high-definition multimedia interface (HDMI) connector, an S-Video connector, and/or the like. Furthermore, the display device 120A may be coupled with the computing device 110A or the computing device 110B via a wireless connection. In such embodiments, the computing devices 110 may communicate one or more signals to the display device 120A using one or more of the wireless communications protocols discussed previously. In some embodiments, the display device 120A may include or couple with a dongle or other like receiving device configured to receive the one or more multimedia signals from the computing devices 110. Furthermore, in some embodiments, the display device 120A and the computing devices 110 may operate in conjunction with one or more remote display protocols, such as the wireless gigabit alliance (WiGiG) protocol, the remote desktop protocol (RDP), PC-over-IP (PCoIP) protocol, the high-definition experience (HDX) protocol, and/or other like remote display protocols.

Network 125 may be any network that allows computers to exchange data. Network 125 may include one or more network elements (not shown) capable of physically or logically connecting computers. The network 125 may include any appropriate network, including an intranet, the Internet, a cellular network, a local area network (LAN), a wide area network (WAN), a personal network or any other such network or combination thereof. Components used for such a system can depend at least in part upon the type of network and/or environment selected. Protocols and components for communicating via such a network are well known and will not be discussed herein in detail. Communication over the network 125 may be enabled by wired or wireless connections, and combinations thereof.

Application server 130 and web server 135 (collectively referred to as "the servers") may be hardware computing devices that may include one or more systems and/or applications for providing one or more services. The servers may include one or more processors, one or more memory devices and/or computer readable storage medium, and one or more network interfaces. Additionally, each of the servers may be a single physical hardware device, may be physically or logically connected with other network devices, such that the servers may reside on one or more physical hardware devices. Moreover, each of the servers may be connected to, or otherwise associated with one or more data storage devices (not shown).

The application server 130 may be any device capable of receiving and responding to requests from one or more client devices (e.g., computing devices 110) across a computer network (e.g., network 125) to provide one or more services. In providing the one or more services, the application server 130 may be able to generate content such as text, graphics, audio, and/or video to be transferred to user 105, which may be served to the viewer by the web server 135 in the form of HTML, XML, MPEG-DASH, and/or any other appropriate structured language. The handling of all requests and responses, (e.g., requests for item information and the information provided in response) as well as the delivery of content between the computing devices 110 and the application server 130 may be handled by the web server 135. The application server 130 may include an operating system that may provide executable program instructions for the general administration and operation of application server 130, and may include a computer-readable medium storing instructions that, when executed by a processor of the application server 130, may allow the application server 130 to perform its intended functions. Suitable implementations for the operating system and general functionality of the servers are known or commercially available, and are readily implemented by persons having ordinary skill in the art, particularly in light of the disclosure herein. Furthermore, it should be understood that the application server 130 may not be required and the applications and software components discussed herein may be executed on any appropriate device or host machine.

As shown in FIG. 1, only one computing device 110A, one sensor 115, one display device 120, one computing device 110B, a single application server 130, and a single web server 135 are present. According to various embodiments, any number of computing devices, any number of display devices, any number of sensors, any number of mobile devices, any number of servers, and/or any number of databases (not shown) may be present. Additionally, in some embodiments, application server 130, web server 135, and/or one or more databases may be virtual machines, and/or they may be provided as part of a cloud computing service. In various embodiments, application server 130, the web server 135, and one or more databases may reside on one physical hardware device, and/or may be otherwise fully integrated with one another. Furthermore, in some embodiments, the computing device 110A, sensor 115, and/or the display device 120A may reside on one physical hardware device, and/or may be otherwise fully integrated with one another. Thus, the depiction of the illustrative communications network 100 in FIG. 1 should be taken as being illustrative in nature, and not limited to the scope of the disclosure.

Figure 2:
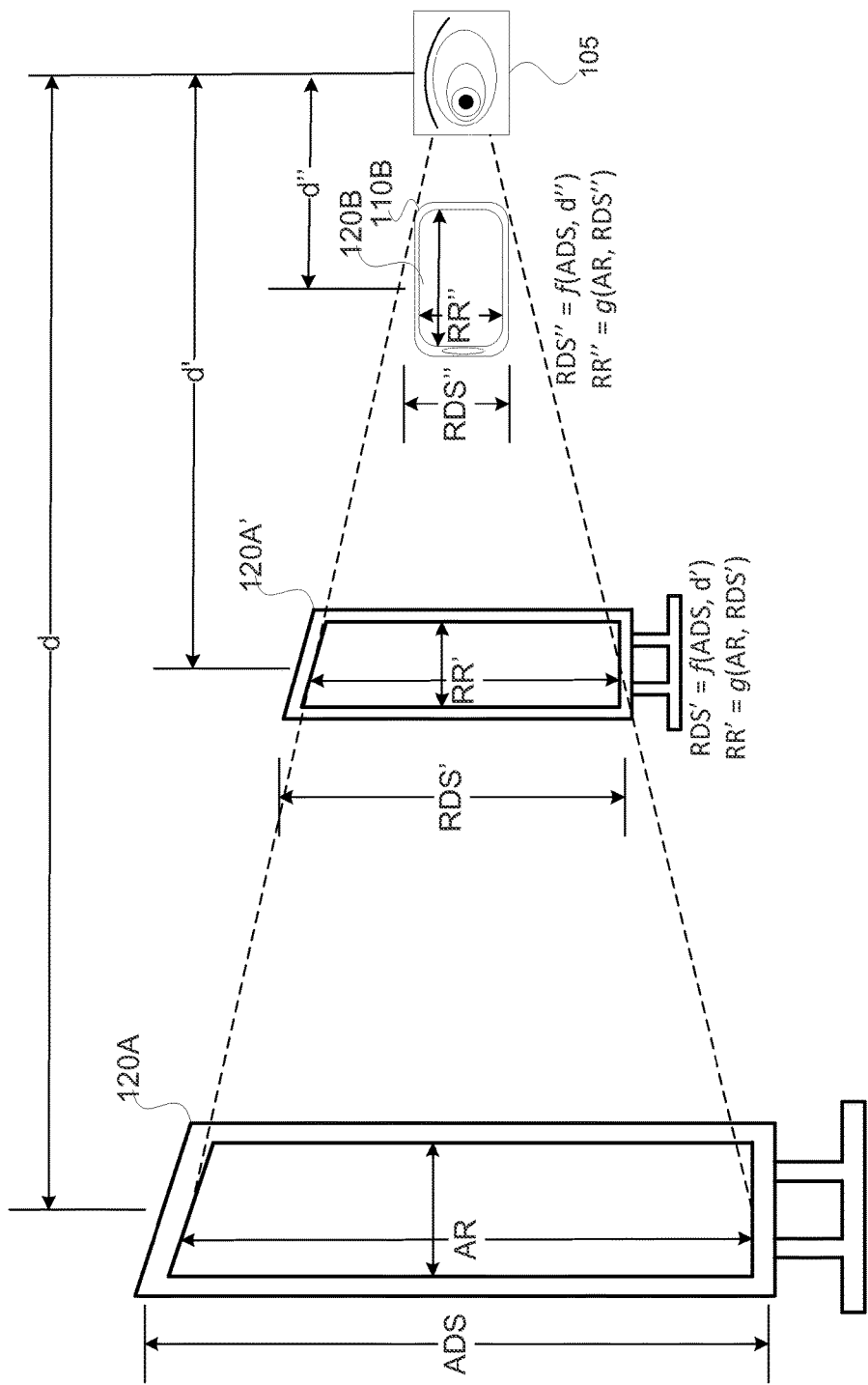
FIG. 2 illustrates a method of determining a relative display size and a relative resolution based on an absolute display size and an absolute resolution, in accordance with various embodiments.

With reference to FIGS. 1-2, the devices of the communications network 100 may operate as follows in accordance with various example embodiments.

By way of a first example, the user 105, utilizing the computing device 110A, may request content from the application server 130 in the form of a data stream. The request may be in the form of one or more hypertext transfer protocol (HTTP) requests in accordance with a dynamic adaptive streaming technique (e.g., MPEG-DASH), and the web server 135 may obtain the content from the application server 130 and provide the content in the form of a data stream comprising data stream segments to the computing device 110A via network 125. The computing device 110A may select one or more first data stream segments that are encoded according to a first bitrate based on network resources that are allocated to the user 105 by an operator of network 125 (e.g., a data plan, internet service subscription, etc.), a current network bandwidth, and/or based on an absolute display size (ADS) and/or an absolute resolution (AR) of the display device 120A. Once received, the first data stream segments may be displayed on display device 120A.

Once the first data stream segments have been requested by the computing device 110A, in various embodiments, the computing device 110A may control the sensor 115 to determine one or more user contexts. The user contexts may include any information related to a viewing environment in which the user 105 is consuming the data stream. According to various example embodiments, the user contexts may be environmental-based, such as a distance between the user 105 and the display device 110A is a user context. The distance between the user 105 and the display device 120 (also referred to as a "viewing distance") may be based on a position of the user 105 relative to a position of the display device 120. Other environment-based user contexts may include viewing direction, user gestures, and surrounding environmental factors. The viewing direction may be an angle of the user 105 relative to the display device 120. The user gestures may include any action or movement made by the user 105, including an orientation of one or more body parts of the user 105. The surrounding environmental factors may include any information regarding an environment in which the user 105 is consuming the data stream, such as ambient lighting, background noise, surrounding electromagnetic fields, and/or any other like biotic or abiotic factors surrounding the user 105. User contexts may be attribute based user contexts, such as device attributes and user attributes. The device attributes may be any information indicative of one or more peripheral devices (e.g., sensor 115 and the like) and/or internal components (e.g., processor types, memory devices, etc.) of the computing devices 110. The user attributes may include any information related to user 105, such as an internet service or cellular service subscription type or data plan, a subscription to one or more content providing services, user preferences, demographic information, etc. The user preferences may include for the user's preference for various content types, the user's preferences for various viewing distances and/or viewing angles, the user's preferences for various content consumption environments, and/or any other like preferences indicating a user's tastes, interests, goals, and the like. In various embodiments, the user preferences may be set by the user 105, or obtained from one or more applications running on the computing devices 110. The user preferences may be obtained explicitly (e.g., by obtaining user ratings and/or rankings) or implicitly (e.g., by mining click-through data, log data, user profile data, and the like).

Once the computing device 110A determines the one or more user contexts, in various embodiments, the computing device 110A determines a virtual screen size and/or a virtual resolution based on the one or more user contexts (it should be noted that the term "virtual resolution" may be considered synonymous with the term "virtual screen", "virtual screen size", and the like). For example, the computing device 110A may determine the virtual resolution based on a relative display size (RDS) and/or a relative resolution (RR), as shown and described with regard to FIG. 2.

FIG. 2 illustrates an example of determining RDS and RR based on an absolute display size (ADS) and an absolute resolution (AR), in accordance with various embodiments. As shown by FIG. 2, the display device 120A includes an ADS and an AR. The ADS is a physical measure of the display region upon which images are displayed. For example, when the display device 120A is a 70-inch TV, the ADS may be 70 inches, which represents the diagonal length of the display region. The AR may be a number of distinct pixels in each dimension (i.e., columns and rows) required to display an image in the display region. For example, when the display device 120A is a 70-inch TV, the AR may be 1920×1080 pixels.

The RDS may be a screen size perceived by the user 105 and the RR may be a resolution perceived by the user 105 based on one or more user contexts. According to the example embodiment shown by FIG. 2, the RDS and the RR may be based on the ADS and the viewing distances (e.g., d, d', and/or d"). The RDS and/or the RR may then be used to calculate the virtual resolution. It should be noted that according to various example embodiments, one or more additional user contexts (e.g., environment-based user contexts, device attributes, user attributes, etc.) may also be used to determine the virtual resolution.

The concept of RDS and/or RR may be based on the concept of human perception changing based on distance and/or display size. For instance, as the distance between the user 105 and the display device 120A increases, the perceived clarity of the displayed content by the user 105 tends to decrease. Furthermore, as the size of the display device 120A decreases, the perceived clarity of the displayed content by the user 105 also decreases even if the distance remains unchanged. The reduction of clarity may be due to the inability of most humans to identify or perceive subtle differences in color at relatively long distances and/or when content is displayed on relatively small devices.

Accordingly, in various embodiments, the RR and/or RDS may be calculated or otherwise determined based on a distance between the user 105 and the display devices 120 and/or a display size of the display devices 120. As shown by FIG. 2, a function for determining the RDS' is expressed as $f(ADS, d')$ and the function for determining the RDS" is expressed as $f(ADS, d")$. For example, when the display device 120A is a 70-inch TV, and d equals 12 feet, d' equals 5 feet, and d" equals 1 foot, the function for determining the RDS' may be expressed as $f(70, 5)$ and the function for determining the RDS" may be expressed as $f(70, 1)$.

The functions for determining RDS' and RDS" indicate that if the user 105 watches the 70-inch TV at a viewing distance d, the display region of the display device 120A may be perceived by the user 105 as being the same or similar to watching a 6-inch display, such as display device 120B of computing device 110B, at a viewing distance of d". Therefore, the resolution of the display device 120A may be reduced to the RR" when the user 105 is at a viewing distance of d. By way of another example, when the display device 120A is the 70-inch TV, if the user 105 watches the 70-inch TV at a viewing distance d-d', the display region of the display device 120A may be perceived as being the same or similar to a 50-inch display being viewed at a viewing distance of d', which is depicted as display device 120A'. Therefore, the resolution of the display device 120A may be reduced to the RR' when the user 105 is at a viewing distance of d'. In various embodiments, the RDS perceived by the user 105 at different viewing distances may be calculated using basic principles of geometric optics.

Additionally, according to various embodiments, the RR may be based on the ADS and the RDS. As shown by FIG. 2, a function for determining the RR' may be expressed as g(AR, RDS') and the function for determining the RR" may be expressed as g(AR, RDS"). In various embodiments, the following equation may be used to calculate the RR for video content based on the RDS.

$$RR = \frac{DS}{d \cdot \tan\left(\frac{1}{60}\right) \cdot \sqrt{\left(\frac{AHR}{AVR}\right)^2 + 1}}$$

In the above equation, DS is the diagonal size of a display device, RR is the relative resolution in pixels (measured as vertical resolution of a video), d is the viewing distance, AHR is the horizontal resolution in pixels of the ADS, and AVR is the vertical resolution in pixels of the ADS. As an example, when the display device 120A is the 70-inch TV and the viewing distance is 15 feet, the RR required on a 6-inch display to provide the same or similar clarity as the AR on the 70-inch TV (1920×1080 pixels) may be expressed using equation 1 as follows:

$$RR = \frac{70}{(15 \cdot 12) \cdot \tan\left(\frac{1}{60}\right) \cdot \sqrt{\left(\frac{1920}{1080}\right)^2 + 1}} \approx 655 \text{ pixels}$$

The above calculation indicates that 655 pixels may be required for a 6-inch display at a 1 foot viewing distance to achieve a same or similar clarity as 1920×1080 pixels on a 70-inch TV at a 15 foot viewing distance. Thus, when the user 105 is at a viewing distance of 15 feet from the display device 120A, the resolution may be reduced by approximately 63% to achieve the same or similar clarity as a 6-inch display at a 1 foot viewing distance.

The above calculations using equation 1 illustrates one example of calculating a RR as the basis for reducing resources. However, it should be noted that the example embodiments are not limited to the above equations for determining RDS and RR. In various embodiments, any other methods and/or algorithms for determining RDS and RR may be utilized without departing from the scope of the embodiments disclosed herein.

Referring back to FIG. 1, according to the first example, once the computing device 110A determines the virtual resolution, the computing device 110A may request one or more second data stream segments from the application server 130 according to the virtual screen size and/or the virtual resolution. The one or more second data stream segments may be requested according to known methods, such as using MPEG-DASH. However, it should be noted that, instead of requesting the one or more second data stream segments at a highest available bitrate based on current network conditions, the example embodiments provide that the one or more second data stream segments are requested based on the virtual resolution, which may be based on the viewing distance of the user 105.

Once the computing device 110A receives the one or more second data stream segments, the computing device 110A may display the second data stream segments on the display device 120A. While the data stream is being displayed on the display device 120A, the computing device 110A may continuously or periodically control the sensor 115 to obtain sensor data indicative of user contexts, which is then used to adjust or alter the virtual resolution.

Continuing with the first example, after some time, the user 105 may leave a viewing area, which may then be detected by the sensor 115. The viewing area may be a region in which a display area of the display device 120A is observable with relatively few distortions and/or artifacts, which in some embodiments, may be based the ADS of the display device 120A. In some embodiments, the viewing area may be a "viewing cone" as defined by the International Organization for Standardization (ISO) 13406-2:2001, ISO 9241-300:2008, ISO 9241-302:2008, and/or ISO 9241-303:2008. In some embodiments, when the computing device 110A determines that the user 105 is outside of the viewing area, the computing device 110A may adjust or otherwise determine the virtual resolution to be a minimum acceptable resolution, and the computing device 110A may request one or more next data stream segments accordingly. Once the computing device 110A determines, using the sensor 115, that the user 105 has re-entered the viewing area, the computing device 110A may adjust or otherwise determine the virtual resolution based on the user position as discussed previously, and the computing device 110A may request one or more next data stream segments accordingly.

Continuing with the first example, after some time, the user 105 may change a position and/or orientation of one or more body parts, such as a head of the user 105 facing away from the display device 120A. The user 105 facing away from the display device 120A may be indicative of the user 105 paying less attention to the content being displayed on the display device 120A. Therefore, in various embodiments, the computing device 110A may reduce the size of the virtual resolution, and the computing device 110A may request one or more next data stream segments accordingly. Next, after some time, the user 105 may face the display device 120A and also lower the ambient lighting surrounding the display device 120A. The user 105 facing towards the display device 120A and/or lowering the ambient lighting may be indicative of the user 105 paying greater attention to the content being displayed on the display device 120A. Therefore, in various embodiments, the computing device 110A may increase the size of the virtual resolution to a maximum available resolution, and the computing device 110A may request one or more next data stream segments accordingly.

Referring back to FIG. 1, by way of a second example, the user 105 may obtain a data stream using the computing device 110B, and the computing device 110B may request first data stream segments of a data stream and display the first data stream segments on the display device 120B in a same or similar manner as discussed above. At this time, the computing device 110B may select the highest available bitrate for streaming the first data stream segments. Next, the computing device 110B may control one or more embedded sensors to determine one or more user contexts, such as by continuously or periodically scanning the face and/or eyes of the user 105. The facial features and/or eye orientation of the user 105 may be indicative of an amount of attention being paid to the content being displayed on the display device 120B. After a period of time, the one or more embedded sensors may obtain sensor data indicating that the eyes of the user 105 are not oriented towards the display device 120B. The computing device 110B may then request one or more second data stream segments at a bitrate that is lower than the highest available bitrate. The lower bitrate may be a lowest acceptable bitrate or a bitrate determined according to one or more user preferences or other like user contexts. Once the computing device 110B detects, using the one or more embedded sensors, that the eyes of the user 105 are again oriented towards the display device 120B, the computing device 110B may again select the highest available bitrate for streaming one or more next data stream segments. This process may repeat until the data streaming session is terminated.

Accordingly, the example embodiments provide that the computing devices 110 may reduce or increase the size of the virtual resolution based on the movements and/or gestures made by the user 105 and/or changes in the user 105's surroundings, thereby altering and/or adjusting the bitrate at which the computing devices 110 request one or more next data stream segments.

Referring back to FIG. 1, by way of a third example, the user 105 using the computing device 110A may request and display one or more first data stream segments of a first data stream in a same or similar manner as discussed previously with regard to the first example. The computing device 110A may obtain information from the application server 130 indicating that a content type of the data stream is in the genre of "children and family", wherein the user 105 has designated "children and family" content to be accessed at a median bitrate regardless of the current available bandwidth. The median bitrate may be a bitrate that is between a maximum available bitrate for streaming content and a minimum acceptable bitrate for streaming the content. The median bitrate, the maximum available bitrate, and the minimum acceptable bitrate may be based on the current bandwidth allocated to the user 105, the current network conditions, the environment based user contexts, policy requirements of the content provider providing the content, computing device attributes, and/or display device attributes. The computing device 110A may then adjust or otherwise determine the virtual resolution to be a sized according to the median bitrate, and the computing device 110A may request one or more next data stream segments accordingly.

Continuing with the third example, the user 105 using the computing device 110A may request and display first data stream segments of a second data stream in a same or similar manner as discussed above with regard to the first example. The computing device 110A may obtain information from the application server 130 indicating that a content type of the data stream is in the genre of "horror", wherein the user 105 has designated horror content to be accessed at the maximum available bitrate based on the one or more environment-based user contexts discussed previously. The computing device 110A may then adjust or otherwise determine the virtual resolution to be the RR in a same or similar manner as discussed previously, and the computing device 110A may request one or more next data stream segments accordingly.

Referring back to FIG. 1, by way of a fourth example, the user 105 using the computing device 110B may request and display first data stream segments of a data stream in a same or similar manner as discussed above with regard to the second example. The computing device 110B may obtain information from a wireless network operator indicating that a data plan associated with the user 105 has reached a first threshold. The first threshold may be based on network resources allocated to the user 105. For example, when the data plan specifies that the user 105 is allocated 40 gigabytes (GB), the first threshold may be 20 GB or the like. The computing device 110B may then adjust or otherwise determine the virtual resolution to be sized according to a minimum acceptable bitrate, and the computing device 110B may request one or more next data stream segments accordingly. Continuing with the fourth example, after some time, the computing device 110B may obtain information from a wireless network operator indicating that a data plan associated with the user 105 has reached a second threshold. The computing device may then connect to another network (e.g. network 125) having a more favorable network resource allocation and/or subscription, and request one or more next data segments over the other network connection. In some embodiments, the computing device 110B may communicate with the computing device 110A to obtain the data stream via a communications network associated with the computing device 110A.

Figure 3:
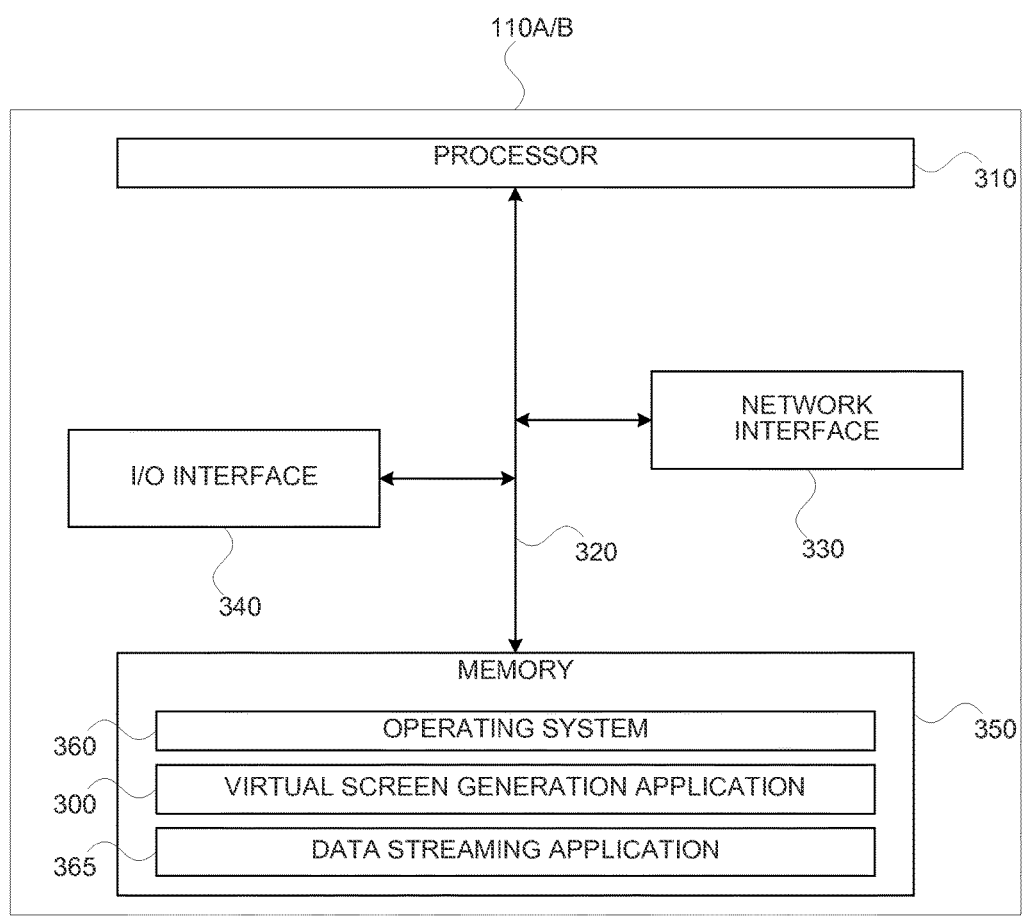
FIG. 3 illustrates the components of a mobile device, in accordance with various example embodiments.

FIG. 3 illustrates the components of the computing devices 110, in accordance with various example embodiments. As shown, computing devices 110 may include processor 310, bus 320, network interface 330, input/output (I/O) interface 340, and memory 350. In some embodiments, computing devices 110 may include many more components than those shown in FIG. 3, such as a display device (e.g., display device 120, a touchscreen, etc.), an input device (e.g., a physical keyboard, a touch screen, etc.), one or more image sensors, a transmitter/receiver (or alternatively, a transceiver), a mobile video card and/or graphics processing unit (GPU), and other like components. However, it is not necessary embodiments.

Memory 350 may be a hardware device configured to store an operating system 360 and program code for one or more software components, such as virtual screen generation application 300 and/or one or more applications 265. Memory 350 may be a computer readable storage medium that generally includes a random access memory (RAM), read only memory (ROM), a flash memory device, a solid state disk (SSD), a secure digital (SD) card, and/or other like storage media capable of storing and recording data. The program code and/or software components may also be loaded from a separate computer readable storage medium into memory 350 using a drive mechanism (not shown). Such separate computer readable storage medium may include a memory card, memory stick, removable flash drive, sim card, and/or other like computer readable storage medium (not shown). In some embodiments, software components may be loaded into memory 350 via network interface 330, rather than via a computer readable storage medium.

During operation, memory 350 may include operating system 360, Virtual screen generation application 300, and data streaming application 365. Operating system 360 may manage computer hardware and software resources and provide common services for computer programs. Operating system 360 may include one or more drivers, such as a display driver, sensor drivers (e.g., a camera driver, etc.), audio drivers, and/or any other like drivers that provide an interface to hardware devices thereby enabling operating system 360, virtual screen generation application 300, and data streaming application 365 to access hardware functions without needing to know the details of the hardware itself. The operating system 360 may be a general purpose operating system or an operating system specifically written for and tailored to the computing device 110B.

Data streaming application 365 may be a collection of software modules and/or program code that enables the computing devices 110 to access or obtain streaming content and/or one or more services provided by a content provider, such as an operator of application server 130. Data streaming application 365 may be a native application, a web application, or a hybrid application. In various embodiments, a content provider may develop the data streaming application 365 as a native or hybrid application configured to obtain and render content specifically provided by the content provider. In some embodiments, data streaming application 365 may be a web application that may be rendered in a web browser of the computing device 110. Virtual screen generation application 300 may be a collection of software modules and/or program code that enables the computing device 110B to operate according to the various example embodiments as discussed with regard to FIGS. 4-5.

Processor 310 may be configured to carry out instructions of a computer program by performing the basic arithmetical, logical, and input/output operations of the system. The term "processor" as used herein refers to a physical central processing unit (CPU). The processor 310 may include a single-core processor, a dual-core processor, a triple-core processor, a quad-core processor, etc. The processor 310 may perform a variety of functions for the computing devices 110 and may process data by executing program code, one or more software modules, firmware, middleware, microcode, hardware description languages, and/or any other like set of instructions stored in the memory 350. The program code may be provided to processor 310 by memory 350 via bus 330, one or more drive mechanisms (not shown), and/or via network interface 330. In order to perform the variety of functions and data processing operations, the program code and/or software components may be executed by the processor 310. On execution by the processor 310, the processor 310 may cause computing devices 110 to perform the various operations and functions delineated by the program code.

For example, in various embodiments, the computing devices 110 may include various modules configured to operate (through hardware and/or software) to obtain content at an adaptable bitrate as described herein. The virtual screen generation application 300 may include various modules that may be loaded into the processor 310. The various modules may include a virtual display engine 405, a user attribute module 410, a device attribute module 415, a device interface module 420, a display module 425, a tiling module 430, and a content access module 435 (as discussed with regard to FIG. 4). Once the various modules of the virtual screen generation application 300 are loaded into memory 350 and executed by the processor 310, the processor 310 may be configured to cause computing devices 110 to control the sensor 115 to determine various viewing distances, viewing directions, user gestures, environmental factors, and the like; determine one or more device attributes of the computing device and/or one or more user attributes; determine a virtual resolution based on viewing distance, viewing direction, user gestures, environmental factors, the device attributes, the user attributes, and the like; provide the virtual resolution to a content provider such as application server 130 via web server 135, and receive, from the content provider, a data stream segment of a data stream encoded at a bitrate based at least in part on the virtual resolution; and provide the data stream segment for display on the display device 120. While specific modules are described herein, it should be recognized that, in various embodiments, various modules may be combined, separated into separate modules, and/or omitted. Additionally, in various embodiments, one or more modules may be implemented on separate devices, in separate locations, or distributed, individually or in sets, across multiple processors, devices, locations, and/or in cloud-computing implementations.

Bus 330 may be configured to enable the communication and data transfer between the components of computing device 110B. Bus 330 may comprise a high-speed serial bus, parallel bus, internal universal serial bus (USB), Front-Side-Bus (FSB), and/or other suitable communication technology for transferring data between components within computing device 110B and/or between computing device 110B and other like devices. In some embodiments, computing device 110 may include an I/O bus such as a PCI bus, a PCI-Express (PCI-e) bus, a Small Computer System Interface (SCSI) bus, and the like.

Network interface 330 may be a computer hardware component that connects computing device 110B to a computer network (e.g., network 125). Network interface 330 may connect computing device 110B to a computer network via a wired or wireless connection. Network interface 330 may operate in conjunction with a wireless transmitter/receiver and/or transceiver (not shown) that is configured to operate in accordance with one or more wireless standards. The wireless transmitter/receiver and/or transceiver may be configured to operate in accordance with a wireless communications standard, such as the IEEE 802.11-2007 standard (802.11), the Bluetooth standard, and/or any other like wireless standards. The communications port may be configured to operate in accordance with a wired communications protocol, such as a serial communications protocol (e.g., the Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocols), and/or a network communications protocol (e.g., Ethernet, token ring, Fiber Distributed Data Interface (FDDI), and/or other like network communications protocols). The network interface 330 may also include one or more virtual network interfaces configured to operate with application 365 and/or other like applications.

I/O interface 340 may be a computer hardware component that provides communication between the computing device 110 and one or more other devices. The I/O interface 340 may include one or more user interfaces designed to enable user interaction with the computing device 110 and/or peripheral component interfaces designed to provide interaction between the computing device 110 and one or more peripheral components. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

As discussed above, computing devices 110 may also include a transmitter and receiver or a transceiver (not shown). The transmitter may be any type of hardware device that generates or otherwise produces radio waves in order to communicate with one or more other devices. The transmitter may be coupled with an antenna (not shown) in order to transmit data to one or more other devices. The transmitter may be configured to receive digital data from one or more components of computing devices 110 via bus 330, and convert the received digital data into an analog signal for transmission over an air interface. The receiver may be any type of hardware device that can receive and convert a signal from a modulated radio wave into usable information, such as digital data. The receiver may be coupled with the antenna (not shown) in order to capture radio waves. The receiver may be configured to send digital data converted from a captured radio wave to one or more other components of mobile terminal 105 via bus 330. In embodiments where a transceiver (not shown) is included with computing devices 110, the transceiver may be a single component configured to provide the functionality of a transmitter and a receiver as discussed above.

Figure 4:
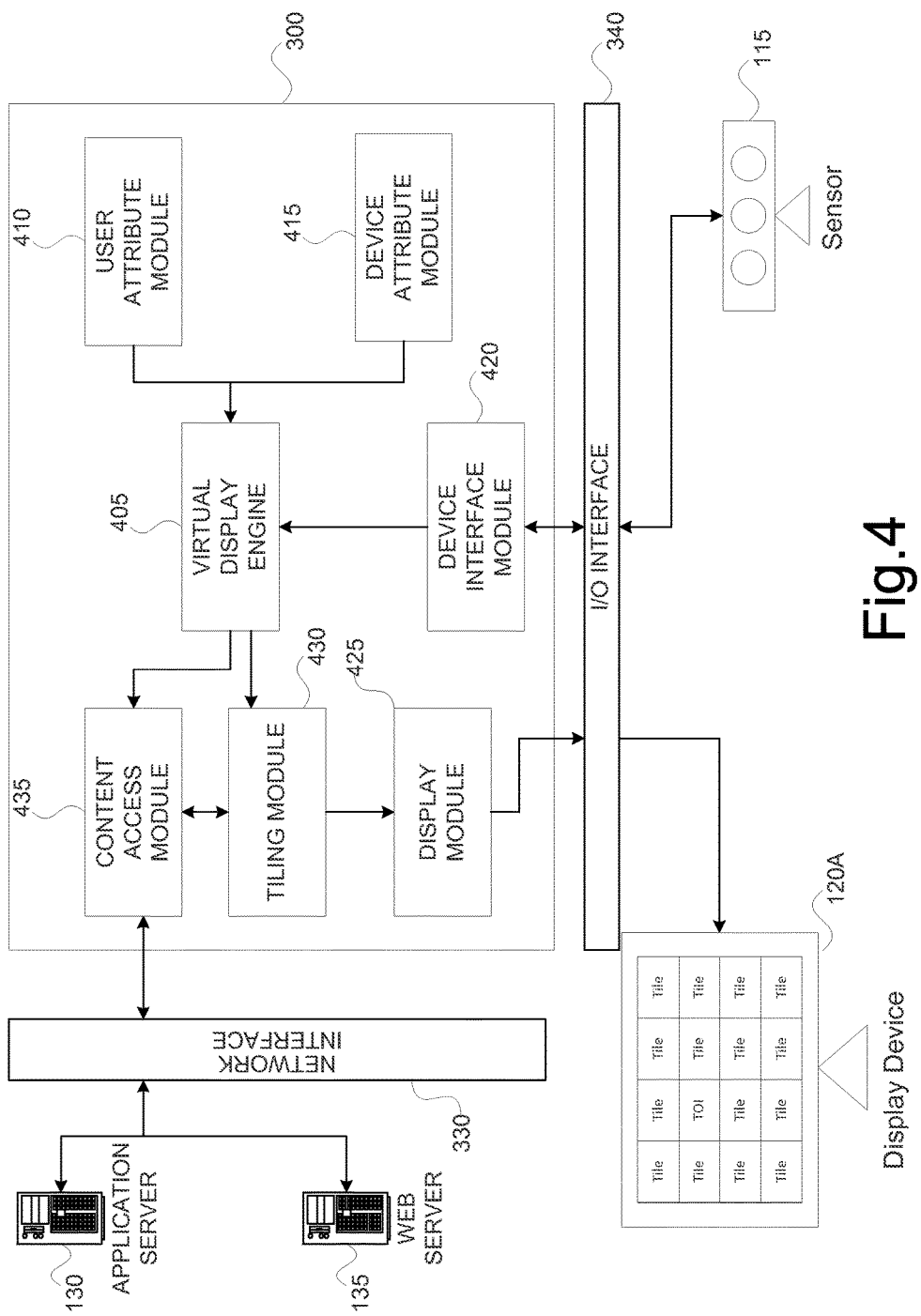
FIG. 4 illustrates example logical components and interaction points of a virtual screen generation application, in accordance with various embodiments.

FIG. 4 illustrates example logical components and interaction points of the virtual screen generation application 300, in accordance with various embodiments. The virtual screen generation application 300 may, in various embodiments, be configured to perform various techniques described herein, including adapting a bitrate of a data stream according to one or more user contexts. As shown in FIG. 4, virtual screen generation application 300 may include virtual display engine 405, user attribute module 410, device attribute module 415, device interface module 420, display module 425, tiling module 430, and content access module 435. According to various example embodiments, and with reference to FIGS. 1-4, the computing device 110 including the virtual screen generation application 300 may operate as follows.

According to various embodiments, the device interface module 420 may obtain data from the one or more hardware components (e.g., sensor data from sensor 115) via the I/O interface 340, and provide the data to the virtual display engine 405 and/or other applications (not shown) for processing. Device interface module 420 may be one or more software modules configured to interact with the various hardware components of the computing device 110. Thus, the device interface module 420 may control the sensor 115 via the I/O interface 340 or otherwise obtain sensor data from the sensor 115 via the I/O interface 340. The obtained sensor data may be indicative of one or more user contexts of the user 105 while the user 105 consumes a data stream being displayed on the display device 120A. The one or more user contexts determined by way of the sensor 115 may include a viewing distance, a viewing angle, one or more user gestures, and/or environmental factors such as ambient lighting surrounding the display device 120 and/or the user 105. In various embodiments, where the user 105 is consuming a data stream on display device 120B of the computing device 110B (not shown in FIG. 4), an image sensor included with the computing device 110B may be controlled or otherwise utilized by the computing device 110B to determine or otherwise obtain one or more user contexts of the user 105. The sensor data indicative of the one or more user contexts are then passed to virtual display engine 405. Once the sensor data indicative of the user contexts are obtained from the sensor 115, the virtual display engine 405 obtains device attributes from the device attribute module 415, and subsequently (or simultaneously), the virtual display engine 405 obtains user attributes from the user attribute module 410. It should be noted that in various embodiments, the virtual display engine 405 may obtain the device attributes from the device attribute module 415 and/or the user attributes from the user attribute module 410 prior to obtaining the sensor data from the device interface module 420.

According to various embodiments, the user attribute module 410 may be configured to determine one or more user attributes associated with the user 105 and/or the computing device 110. It should be noted that the user attributes may be considered types of user contexts. The user attributes may include any information related to user 105, such as an internet service or cellular service subscription type or data plan, a subscription to one or more content providing services, preferences for various content types, demographic information associated with the user 105, and/or any other like information pertaining to the user 105. In various embodiments, the user preferences may be set by the user 105, wherein the user 105 defines one or more desired relative resolutions based on certain user contexts. In some embodiments, the user attributes may be obtained from one or more applications running on the computing devices 110, wherein the information obtained from the one or more applications are used to define one or more relative resolutions and/or adjust the virtual resolution. For example, one or more user attributes may be mined or otherwise obtained from a social network profile of the user 105 associated with a social network application running on the computing device 110.

In various embodiments, the one or more user attributes may define or otherwise indicate desired relative resolutions for each of a plurality of content types, each of a plurality of device types, one or more device positions and/or locations, one or more device orientations, one or more device movement velocities and/or accelerations, one or more gestures or body movements, and/or the like. For example, the user 105 may define a first desired resolution (e.g., a maximum available resolution) for a first content type (e.g., horror movies/TV shows, action/adventure movies/TV shows, music videos, etc.), a second desired resolution (a resolution based on viewing distance, viewing angle, etc.) for a second content type (e.g., news casts and the like), a third desired resolution (e.g., a minimum available resolution) for a third content type (e.g., children's and family related content), and the like. By way of another example, the user 105 may define that, when using the computing device 110B, a first desired resolution (e.g., a maximum available resolution) should be used when the computing device 110B is oriented in a first orientation (e.g., a landscape orientation) and a second desired resolution (e.g., a minimum available resolution) should be used when the computing device 110B is oriented in a second orientation (e.g., a portrait orientation). By way of another example, the user 105 may define that, when using the computing device 110B, a first desired resolution (e.g., a maximum available resolution) should be used when the computing device 110B is stationary and/or moving at a relatively low velocity and a second desired resolution (e.g., a minimum available resolution) should be used when the computing device 110B is moving at a relatively high velocity, such as when the computing device 110B is a mobile phone traveling in an automobile or the computing device 110B is an IVI or ICE device. By way of another example, the user 105 may define that, when using the computing device 110B, a first desired resolution should be used when the computing device 110B is located at one or more first locations (e.g., a home of the user 105, the user 105's office/school, etc.) and a second desired resolution should be used when the computing device 110B is located at one or more second locations (e.g., an outside location such as a park, etc.).

Moreover, the user 105 may define desired resolutions based on user activities and/or user gestures. For example, the user 105 may define a first desired resolution for a period in which the user 105 is focusing on something other than the display device 120 and/or outside of a display area of the display device 120, and define a second desired resolution for a period in which the user 105 is focusing on the display device 120. Furthermore, in some embodiments, the user 105 may define one or more gestures or body movements that indicate a desire for higher clarity content, and may define one or more gestures or body movements that indicate a desire for lower clarity content. For example, the user 105 could define a first sign language movement to indicate a desire for higher clarity content, and define a second sign language movement to indicate a desire for lower clarity content. It should be noted that the sign language movement of the previous example does not have to be an intelligible sign language movements, but rather, a defined movement to indicate a desired clarity level only needs to be distinguishable and repeatable.

It should be noted that the aforementioned examples are meant to be illustrative of the example embodiments, and according to various embodiments, the virtual resolution may adjusted or altered according to any combination of the aforementioned examples and/or with any other examples disclosed herein.

According to various embodiments, the device attribute module 415 may be configured to determine one or more device attributes of the computing device 110. The device attributes may indicate one or more internal components of the computing device 110 and/or one or more external (or peripheral) components associated with the computing device 110. It should be noted that the one or more external (or peripheral) components may not be connected with the computing device 110 via a wired connection, but rather, the one or more external (or peripheral) components may be communicatively coupled with the computing device 110. Such communicatively coupled external devices may include a Bluetooth audio device (e.g., Bluetooth earpiece, Bluetooth headphones, etc.), a head-mounted display device (e.g., wearable glasses, augmented reality display devices, etc.), and the like.

The device attributes may be in the form of a component type and/or component parameters. The component type may indicate one or more sensors (e.g., sensor 115) associated with the computing device 110, one or more processors associated with the computing device 100, one or more memory devices associated with the computing device 100, one or more display devices (e.g., display device 120) associated with the computing device 100, one or more network interfaces (e.g., network interface 330) associated with the computing device 100, and the like. The component parameters may indicate parameters, such as processor speed and/or processor clock rate, temperature of the computing device 110, a temperature of one or more chips within computing device 110, battery usage and/or current battery charge amount, battery temperature, available and/or used memory space, memory fragmentation, current and/or predicted network bandwidth or bitrate, and/or any other like component parameters. It should be noted that the device attributes may be considered a type of user context. In various embodiments, the one or more device attributes may be used by the virtual display engine 405 to alter or adjust a virtual resolution.

According to various embodiments, the virtual display engine 405 may be configured to determine a virtual resolution based on the user contexts obtained from the sensor 115, the user attribute module 410, and the device attribute module 415. In various embodiments, the virtual resolution may be based at least in part on an AR, ADS, RDS, and/or RR of display device 120A associated with the computing device 110A. The RDS and/or RR may be based on the user position relative to the display device 120A, which may be based on a viewing distance between the user 105 and the display device 120A, or a position of the user 105 relative to a position of the display device 120A. In such embodiments, the virtual display engine 405 may generate or otherwise determine the RR as discussed previously with regard to FIG. 2, and may use the RR to determine the virtual resolution.

In various embodiments, when the virtual display engine 405 obtains the sensor data from the sensor 105 via the device interface module 420, the virtual display engine 405 may determine whether the user 105 is within a viewing area of the display device 120. The viewing area may be a region in which a display area of the display device 120 is observable with little or no distortions or artifacts. It should be noted that the viewing area may also be referred to as a "viewing cone". The viewing area may be defined as a region or vicinity in a viewing direction of the display device 120 based on the ADS of the display device 120A. In some embodiments, the virtual display engine 405 may adjust or alter the virtual resolution to be a predefined minimum acceptable resolution when the user 105 is determined to be outside of the viewing area. In some embodiments, the virtual display engine 405 may adjust or alter the virtual resolution according to the user position of the user 105 when the user 105 is determined to be within the viewing area.

As noted previously, the virtual display engine 405 may determine one or more user contexts using sensor data obtained from the sensor 115, such as a viewing distance (based on a user position), a viewing angle, and one or more user gestures. The viewing distance, viewing angle, and one or more user gestures may be indicative of how much attention the user 105 is paying to the data stream being displayed on the display device 120A. Accordingly, in various embodiments, the virtual display engine 405 may determine a user focus based on the user position, the viewing angle, and the one or more gestures, and adjust or alter the virtual resolution based on the user focus. In various embodiments, the virtual display engine 405 may reduce or decrease the virtual resolution as the amount of attention is reduced or decreased, and the virtual display engine 405 may increase the virtual resolution as the amount of attention increases. In various embodiments, the virtual display engine 405 may adjust and/or set the virtual resolution to be a first desired resolution when the user focus is greater than or equal to a focus threshold, and determine the virtual resolution to be a second desired resolution when the user focus is less than the focus threshold. The specific values of the focus threshold, the first desired resolution and/or the second desired resolution may be application specific, chosen according to one or more system design choices, and/or chosen according to one or more user preferences.

By way of example, the virtual display engine 405 may determine that the user 105 may not being paying a relatively great amount of attention to content being displayed on the display device 120 (i.e., the user 105 is determined to have a relatively low user focus) if the user 105 is relatively far from the display device 120, outside of a desired viewing area, and the like. By way of another example, if the user 105 is directly in front of the display device 120, a user gesture may be indicative of the user 105 paying relatively little attention to the display device 120, such as the user 105 looking away from the display device 120A, etc. In various embodiments, the virtual display engine 405 may utilize a skeletal mapping system or application in order to determine the one or more user gestures, user position, and/or user orientation. The skeletal mapping system or application may be used to determine and/or measure body angles based in part on the angular distance between two or more skeletal points. In such embodiments, the body angles may be used to determine the user position and/or user orientation of the user 105 or a position and/or orientation of one or more body parts of the user 105. The user position, user orientation, and/or the orientation of one or more body parts of the user 105 may then be used to determine the one or more gestures. In some embodiments, a facial recognition system or application may be used to determine one or more gestures. In such embodiments, the facial recognition system or application may utilize an algorithm that analyzes the relative position, size, shape, depth, contour, orientation and/or angles of the eyes, nose, cheekbones, jaw, and/or other facial features in order to identify a gesture that the user 105 is making with his/her face. It should be noted that the specific user positions, user orientations, and/or user gestures used to determine the user focus may be based on one or more design choices and/or empirical studies.

Furthermore, in various embodiments, the virtual display engine 405 may adjust or alter the virtual resolution based on the one or more device attributes received from the device attribute module. For example, the virtual display engine 405 may decrease or increase the virtual resolution based on a current processor capacity, current temperature of the computing device 110, a temperature of one or more chips within computing device 110, current battery usage and/or current battery charge amount, current battery temperature, available and/or used memory space, memory fragmentation, current and/or predicted network bandwidth or bitrate, and/or any other like component parameters. In some embodiments, the virtual display engine 405 may instruct one or more internal components, via the device attributes module 415, to adjust a mode of operation according to the virtual resolution. A mode of operation may include one or more functions or settings of the computing device 110. For instance, a mode of operation may include settings and functions such as audio settings and functions, display settings and functions, vibration settings and functions, input/output settings and functions, application settings and functions, security settings and functions, network access settings and functions, data storage settings and functions, and/or any other like settings and/or functions associated with computing device 110. Adjusting the mode of operation may include configuring, changing, altering, varying, enabling, disabling, or otherwise modifying one or more of the aforementioned settings and functions of the computing device 110. Furthermore, a mode of operation may include modifying a combination of the aforementioned functions and settings, which according to various embodiments, may be performed in a desired order. Once the virtual display engine 405 determines the virtual resolution based on the one or more user contexts (e.g., the user position, viewing angle, viewing direction, user focus, user attributes, device attributes, user preferences, etc.), the virtual display engine 405 provides the virtual resolution to the content access module 435.

According to various embodiments, the content access module 435 may be configured to provide the virtual resolution to a content provider, such as an operator of the application server 130 and/or the web server 135. In various embodiments, the content access module 435 may select a bitrate for a data stream segment according to an adaptive bitrate streaming technique, such as MPEG-DASH and the like. As noted previously, a content provider (e.g., the application server 130) may encode data stream at multiple bitrates and for multiple resolutions, wherein the data stream for each bitrate is segmented into multiple data stream segments. Each of the data stream segments may vary in length or size such that a first data stream segment may have a different length and/or size than a second data stream segment. The content access module 435 may be made aware of the available data streams at differing bitrates by way of a manifest file provided by the application server 130. In such embodiments, the manifest file may be a media presentation description (MPD) that indicates data stream segment information, such as timing information, location of the data stream or data stream segments (e.g., one or more URLs), media characteristics, video resolution, and bitrates, and the like.

According to typical adaptive bitrate streaming techniques, when a client device begins streaming of a data stream, the client device requests data stream segments at a lowest bitrate stream provided by a content provider, and if the client device determines that a current download speed is greater than the bitrate of the already downloaded data stream segment, the client device requests the next data stream segment at the next higher bitrate; if the client device determines that the current download speed is lower than the bitrate for the already downloaded data stream segment, and therefore, the network throughput has deteriorated, then the client device will request the next data stream segment at the next lower bitrate. By contrast, according to various example embodiments, when starting a data stream, the content access module 435 may request one or more data stream segments from the application server 130 at a lowest bitrate stream according to the virtual resolution received from the virtual display engine 405, and then may request one or more next higher bitrate data stream segments if, for example, the virtual display engine 405 determines that a user focus indicates that the user 105 is paying close attention to the display device 120. In some embodiments, the virtual resolution may indicate multiple bitrates for requesting data stream segments based on current network bandwidth. In such embodiments, the content access module 435 may select the bitrate for one or more next data stream segments based on both the virtual resolution and the current network bandwidth.

Furthermore, typical adaptive bitrate streaming techniques request the next data stream segments based on a current bandwidth and current CPU utilization. Additionally, according to various embodiments, the virtual display engine 405 may adjust and/or alter the virtual resolution based on the device parameters, which include current bandwidth and current CPU utilization. Therefore, in some embodiments, the content access module 435 may not take into account the current bandwidth and current CPU utilization because those parameters are used to adjust the virtual resolution. However, in some embodiments, the virtual display engine 405 may not adjust the virtual resolution based on the device parameters, and in such embodiments, the content access module 435 may take into consideration the device parameters when selecting bitrates. In this way, the example embodiments may be implemented as an add-on to already existing adaptive bitrate streaming techniques, such as MPEG-DASH, or the example embodiments could be implemented as a stand-alone product.

Once the content access module 435 selects a bitrate for one or more data stream segments based on the virtual resolution, the content access module 435 may request and receive the one or more data stream segments from the application server 130 and/or the web server 135 via the network interface 330 according to known methods. In response, the content access module 435 may provide the received one or more data stream segments and/or virtual resolution information to the tiling module 430.

According to various embodiments, the tiling module 430 may be configured to divide frames of the data stream into a plurality of tiles. The tiling module 430 may be a software module that operates in conjunction with one or more hardware devices (e.g., processor 310, one or more GPUs, etc.). A tile may be an array of pixels or any other like grid in a digital image, such as a video frame. Tile rendering may include dividing a display area into a number of tiles, and rendering each tile separately. In various embodiments, the tiling module 430 may break the data stream segments, which are received from the content access module 435, into multiple tiles based on metadata that defines one or more focus areas. The metadata defining the one or more focus areas may be received from the virtual display engine 405. The metadata defining the one or more focus areas may be based on the user focus information determined by the virtual display engine 405, such as user position, user orientation, user body part orientation information (e.g., eye orientation, head orientation, etc.), and/or the other aforementioned information used to determine the user focus. The tiling module 430 may determine a tile of interest (TOI) of one or more frames based on the metadata indicating the user focus, and then instruct the content access module 435 to request one or more next data segments for each tile at different bitrates, such that the one or more next data segments for the TOI is obtained using a higher bitrate than the other tiles of the one or more next data segments. For example, the virtual display engine 405 may determine the virtual resolution indicates a first virtual resolution for one or more TOIs and a second virtual resolution for the other tiles that are not the focus of the user's attention. The tiling module 430 may then decode and reassemble the tiles of the one or more next data steam segments into one or more frames to be displayed on the display device 120 via the display module 425. For example, the content access module 435 may request the one or more next data stream segments for the TOI according to the first virtual resolution and request the one or more next data segments for the other tiles according to the second virtual resolution. The specific values for the first virtual resolution and/or the second virtual resolution may be based on one or more design choices, one or more user preferences, and/or the like.

In some embodiments, the tiling module 435 may also divide each frame of the data stream into multiple layers and/or video objects of varying shapes and/or sizes according to the MPEG-4 Advanced Video Coding (AVC) standard. In such embodiments, each video object may be a portion of a video frame while the remaining part of the video frame is regarded as a background. Typically, a content provider (i.e., the encoder side) may encode the background only once, while encoding the other video objects at different encoding rates over a period of time. A client device (i.e., the decoder side) may reconstruct the data stream by adding the background to the other decoded video objects. Because the encoder side may encode the objects of interest at different encoding rates than the background, the total bitrate of the data stream can be reduced. However, the typical implementations do not differentiate between the objects of interest according to the focus and/or attention being paid by the user 105 to each of the objects of interest. Additionally, in typical implementations, the objects of interest are determined at the encoder side by a Video Object Plane (VOP) definition, and at the decoder side the video objects are typically extracted from the data stream, decoded, and reassembled into an output video to be displayed. However, according to various embodiments, the titling module 430 may determine an object of interest that is focused upon based on the user focus information, and then instruct the content access module 435 to request one or more next data segments for each video object at different bitrates, such that the one or more next data segments for the focused-on object of interest is obtained using a higher bitrate than the other video objects of the one or more next data segments. This may be different than the typical implementations where each of the video objects (other than the background) are typically streamed to the client device at a same or similar bitrate.

Once the tiling module 435 reassembles the tiles and/or the video objects of the one or more next data steam segments into one or more frames, the tiling module 435 may provide the reassembled data stream segments to the display module 425.

According to various embodiments, the display module 425 may be configured to provide the reassembled and/or decoded data stream segments for display on the display device 120 by, for example, converting the data stream segments into a form that is suitable for display on the display device 120. Additionally, the display module 425 may be one or more software modules that operate in conjunction with one or more hardware devices to provide data stream segments to the display device 120 via the I/O interface 340. The display module 425 may operate in accordance with one or more known display protocols, such as video graphics array (VGA) protocol, the digital visual interface (DVI) protocol, the high-definition multimedia interface (HDMI) specifications, the display pixel interface (DPI) protocol, and/or any other like standard that may define the criteria for transferring audio and/or video data to a display device. Furthermore, the display module 425 may operate in accordance with one or more remote display protocols, such as the wireless gigabit alliance (WiGiG) protocol, the remote desktop protocol (RDP), PC-over-IP (PCoIP) protocol, the high-definition experience (HDX) protocol, and/or other like remote display protocols. In such embodiments, the display module 425 may provide data stream segments to the display device 120 via the network interface 330 rather than the I/O interface 340.

As shown in FIG. 4, the virtual screen generation application 300 may comprise each of the virtual display engine 405, the user attribute module 410, the device attribute module 415, the device interface module 420, the display module 425, the tiling module 430, and the content access module 435. However, according to various embodiments, additional modules may be present and/or the aforementioned modules may be combined of divided into other logical components. Additionally, in various embodiments, one or more of the modules shown in FIG. 4 may be provided as part of a cloud computing service such that one or more physical hardware devices may provide the same or similar functionality as the one or more of the modules shown in FIG. 4. For example, the one or more of the modules could be implemented by a server, where the computing device 110 may provide user focus data or other like sensor data to the server so that the server may determine the virtual resolution and request the one or more data stream segments according to the virtual resolution on behalf of the computing device 110.

Figure 5:
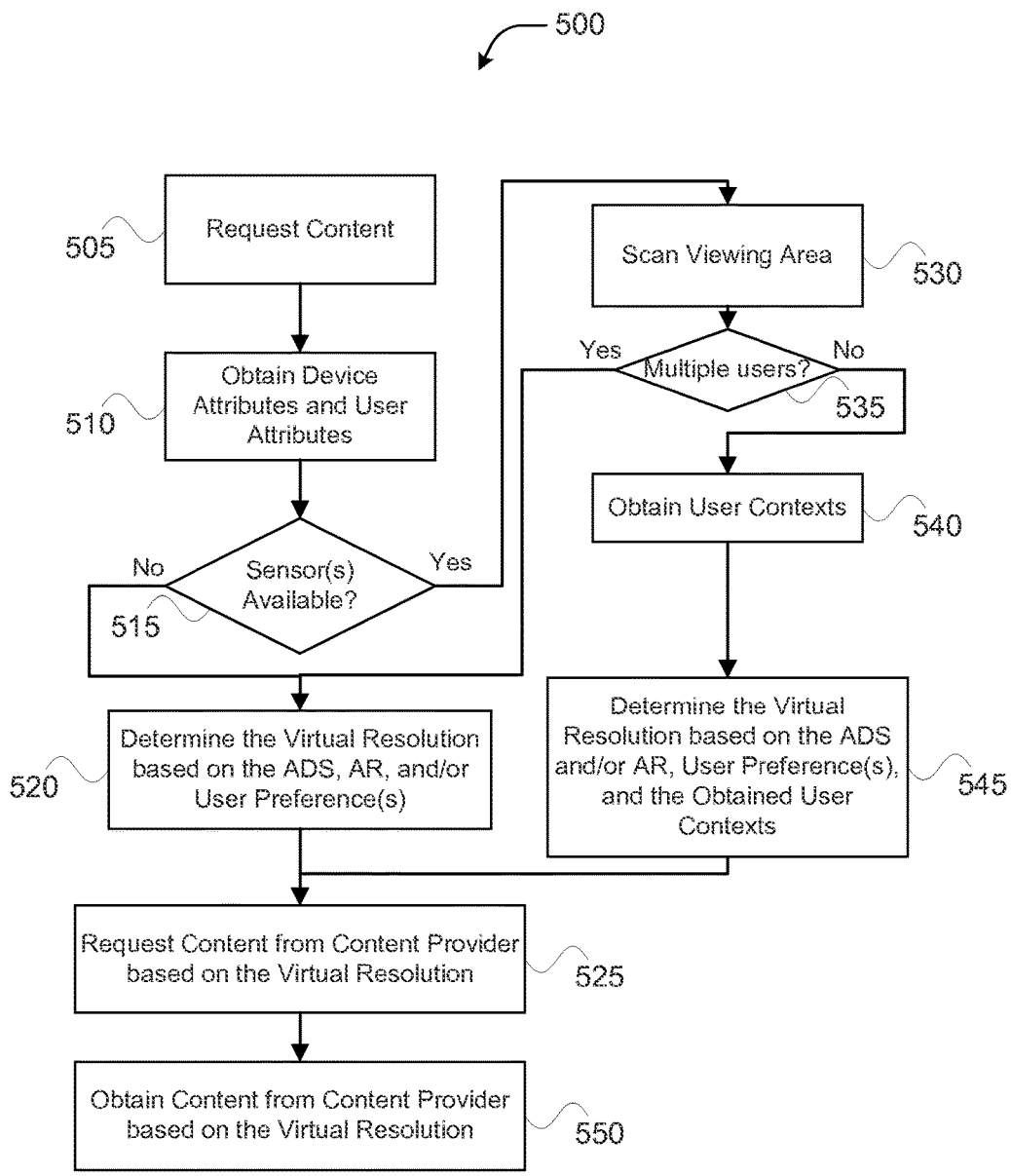
FIG. 5 illustrates an example process of a virtual screen generation application, in accordance with various embodiments.

FIG. 5 is a flowchart illustrating an example process 500 of the virtual screen generation application 300, in accordance with various embodiments. For illustrative purposes, the operations of process 500 will be described as being performed by the computing device 110 utilizing the various modules, as described with respect to FIG. 4. However, it should be noted that other similar devices may operate the process 500 as described below. While particular examples and orders of operations are illustrated in FIG. 5, in various embodiments, these operations may be re-ordered, broken into additional operations, combined, and/or omitted altogether.

Referring to FIG. 5, at operation 505, the content access module 435 of the computing device 110 may request content from the application server 130. The content access module 435 may request the content via a web browser of the computing device 110, or via a native application. In some embodiments, the native application may be developed by the content provider such that the computing device 110 may only access the content provided by the content provider. In various embodiments, one or more data stream segments or frames of the obtained content may be provided to the display device 120 for display.

At operation 505, the content access module 435 of the computing device 110 may request content from the application server 130. At operation 510, the virtual display engine 405 of the computing device 110 may obtain the device attributes from the device attribute module 415 and/or user attributes from the user attribute module 410. At operation 515, the virtual display engine 405 of the computing device 110 may determine whether one or more sensors (or one or more embedded sensors) are available or not based on the obtained device attributes. In embodiments where computing device 110 is a mobile device (e.g., computing device 110B as shown in FIG. 1), the virtual display engine 405 may access a camera or other like image sensor embedded in the mobile device via the device interface module 420, or may access the sensor 115 via the device interface module 420. In embodiments where the computing device 110 is substantially stationary (e.g., computing device 110A as shown in FIG. 1), the sensor 115 may be accessed via the device interface module 420.

If at operation 515 the virtual display engine 405 of the computing device 110 determines that a sensor is not available, the virtual display engine 405 of the computing device 110 may proceed to operation 520 to calculate or otherwise determine the virtual resolution based on the actual display size of the display device 120 and/or based on one or more user preferences.

Referring back to operation 515, if the virtual display engine 405 of the computing device 110 determines that at least one sensor is available, the virtual display engine 405 of the computing device 110 may proceed to operation 530 to scan a viewing area associated with the display device 120. In various embodiments, the virtual display engine 405 may operate in conjunction with the device interface module 420 to control the one or more sensors 115 (or one or more embedded sensors, etc.) to scan the viewing area. The device interface module 420 may obtain, from the one or more sensors 115, sensor data that is indicative of one or more users present in the viewing area. In various embodiments, the display interface module 420 may convert the sensor data into information pertaining to the number of users in the viewing area, which may then be provided to the virtual display engine 405.

At operation 535, the virtual display engine 405 of the computing device 110 may determine whether there are multiple users 105 in a viewing area of the display device 120. If at operation 535, the virtual display engine 405 of the computing device 110 determines that there are multiple users 105 in a viewing area of the display device 120, the computing device 110 may proceed to operation 520 to calculate or otherwise determine the virtual resolution based on the actual display size and/or actual resolution of the display device 120 and/or based on one or more user preferences. It should be noted that in some embodiments, the user 105 may have set one or more user preferences in order to achieve a desired resolution when multiple users are present, such as when the user 105 invites friends to watch a movie, sporting event, etc., together. In such embodiments, at operation 520, the virtual display engine 405 may adjust or otherwise determine the virtual resolution to be the desired resolution when multiple users are present.

Furthermore, it should be noted that in some embodiments, instead of determining the virtual resolution based on the actual display size and/or actual resolution of the display device 120 and/or based on one or more user preferences when multiple users are present, the virtual display engine 405 may determine the virtual resolution based on the user position of each of the multiple users in a viewing area of the display device 120A. In such embodiments, the virtual display engine 405 may obtain a user position and/or a user orientation for each of the multiple users from the device interface module 420, determine whether a number of the multiple users that are within the viewing area based on the ADS and each user position and/or each user orientation, and determine the virtual resolution based on the user positions and/or the user orientations according to the number of users determined to be within the viewing area. In some embodiments, the virtual display engine 405 may determine a user focus for each of the multiple users and adjust the virtual resolution according to a maximum user focus of the multiple users. In other embodiments, the virtual display engine 405 may determine a user focus for each of the multiple users, sum or otherwise combine each of the user focuses, and adjust the virtual resolution according to the combined user focuses.

If at operation 535, the virtual display engine 405 of the computing device 110 determines that there is only one user 105 in a viewing area of the display device 120, the computing device 110 may proceed to operation 540 to obtain user contexts. In various embodiments, the virtual display engine 405 may operate in conjunction with the device interface module 420 to control the one or more sensors 115 (or one or more embedded sensors, etc.) to determine the various user contexts. The device interface module 420 may obtain, from the one or more sensors 115, sensor data that is indicative of a user position, user gestures, viewing angle, number of users, ambient lighting, background noise levels, one or more tiles of interest (TOI), and the like. In various embodiments, the display interface module 420 may convert the sensor data into the user context information, which may then be provided to the virtual display engine 405 for calculating the virtual resolution.

At operation 545, the virtual display engine 405 of the computing device 110 may calculate or otherwise determine the virtual resolution based on the ADS and/or AR, one or more user preferences, and the user contexts obtained using the one or more sensors. It should be noted that the user attributes obtained at operation 510 may indicate the one or more user preferences user to determine the virtual resolution at operation 545. Once the virtual display engine 405 of the computing device 110 determines the virtual resolution, the computing device 110 may proceed to operation 525 to utilize the content access module 435 to request content from the application server 130 based on the virtual resolution. The computing device 110 may then proceed to operation 550 to obtain the content from the content provider based on the virtual resolution, which may then be provided to the display device 120 for display.

Some non-limiting Examples are provided below.

Example 1 may include computing device comprising at least one processor; a virtual display engine to operate on the at least one processor to determine a virtual resolution based at least in part on an absolute resolution of a display device associated with the computing device and a relative display size of the display device, wherein the relative display size is based on a user position and an absolute display size of the display device, wherein the user position is a position of a user of the computing device relative to a position of the display device, and the absolute resolution is based on the absolute display size; a content access module to operate on the at least one processor to receive, from a content provider, a data stream segment of a data stream encoded at a bitrate based at least in part on the virtual resolution; and a display module to operate on the at least one processor to provide the data stream segment for display on the display device.

Example 2 may include the computing device of the preceding example, and/or any of the examples described herein, wherein the virtual display engine is to adjust the virtual resolution according to one or more user preferences such that the content access module is to select the bitrate for the data stream segment based further on the one or more user preferences.

Example 3 may include the computing device of any of the preceding examples, and/or any of the examples described herein, wherein the content access module is to determine a current bandwidth allocated to the computing device, and select a bitrate for a next data stream segment of the data stream based further on the current bandwidth.

Example 4 may include the computing device of any of the preceding examples, and/or any of the examples described herein, further comprising a device attribute module to operate on the at least one processor to determine one or more device attributes of the computing device, wherein the device attributes indicate one or more sensors associated with the computing device; and a device interface module to operate on the at least one processor to control the one or more sensors to determine the user position.

Example 5 may include the computing device of any of the preceding examples, and/or any of the examples described herein, wherein the virtual display engine is to obtain the user position from the device interface module, determine whether the user is within a viewing area based on the user position and the absolute display size wherein the viewing area is a region in which a display area of the display device is observable, determine the virtual resolution to be a minimum acceptable resolution when the user is determined to be outside of the viewing area, and determine the virtual resolution based on the user position when the user is determined to be within the viewing area.

Example 6 may include the computing device of any of the preceding examples, and/or any of the examples described herein, wherein the device interface module is to control the one or more sensors to obtain a viewing direction wherein the viewing direction is an angle of the user relative to the display device, and obtain one or more gestures of the user; and the virtual display engine is to determine a user focus based on the user position, the viewing angle, and the one or more gestures, and determine the virtual resolution based on the user focus, wherein the user focus indicates an amount of attention being paid to data stream segments of the data stream such that the virtual resolution is decreased as the amount of attention is decreased and the virtual resolution is increased as the amount of attention is increased.

Example 7 may include the computing device of any of the preceding examples, and/or any of the examples described herein, wherein the device interface module is to control the one or more sensors to determine a number of users consuming the data stream; when the number of users consuming the data stream is determined to be greater than one, the virtual display engine is to determine the virtual resolution to be the absolute resolution; and when the number of users consuming the data stream is determined to be equal to one, the virtual display engine is to determine the virtual resolution based on the user focus.

Example 8 may include the computing device of any of the preceding examples, and/or any of the examples described herein, further comprising a user attribute module to operate on the at least one processor to determine one or more user attributes associated with the computing device, wherein the virtual display engine is to obtain the one or more user attributes from the user attribute module and determine the virtual resolution based on the one or more user attributes.

Example 9 may include the computing device of any of the preceding examples, and/or any of the examples described herein, wherein the one or more user attributes define a plurality of desired resolutions for each of a plurality of content types, each of a plurality of device types, and one or more device locations, and the virtual display engine is to determine the virtual resolution to be one of the plurality of desired resolutions according to a content type of the data stream, a device type of the display device or the computing device, and a location of the display device or the computing device.

Example 10 may include the computing device of any of the preceding examples, and/or any of the examples described herein, wherein the one or more user attributes define a first desired resolution and a second desired resolution, wherein the first desired resolution is greater than the second desired resolution, the device interface module is to control the one or more sensors to determine a user orientation, wherein the user orientation is an orientation of at least one body part of the user, and the virtual display engine is to obtain the user position and the user orientation from the device interface module, determine a user focus based on the user position and the user orientation, determine the virtual resolution to be the first desired resolution when the user focus is greater than or equal to a focus threshold, and determine the virtual resolution to be the second desired resolution when the user focus is less than the focus threshold.

Example 11 may include the computing device of any of the preceding examples, and/or any of the examples described herein, wherein the one or more user attributes define a subscription associated with the user, and the user attribute module is to obtain subscription information indicating an available data usage associated with the subscription, and the virtual display engine is to obtain the subscription information from the user attribute module, and determine the virtual resolution according to the subscription information such that the virtual resolution is decreased as the available data usage is decreased and the virtual resolution is increased as the available data usage is increased.

Example 12 may include the computing device of any of the preceding examples, and/or any of the examples described herein, wherein the one or more user attributes indicate a plurality of other computing devices associated with the user wherein at least one of the plurality of other computing devices are associated with a corresponding subscription, and the user attribute module is to obtain subscription information for each of the plurality of other computing devices indicating an available data usage associated with the corresponding subscription, and the virtual display engine is to obtain the subscription information for each of the plurality of other computing devices from the user attribute module, and determine the virtual resolution according to the subscription information such that the virtual resolution is decreased as the available data usage is decreased and the virtual resolution is increased as the available data usage is increased.

Example 13 may include the computing device of any of the preceding examples, and/or any of the examples described herein, wherein the device attributes further indicate one or more internal components of the computing device, and the virtual display engine is to instruct the one or more internal components to adjust a mode of operation according to the virtual resolution.

Example 14 may include the computing device of any of the preceding examples, and/or any of the examples described herein, wherein the device interface module is to control the one or more sensors to obtain the user position and a user orientation, and the virtual display engine is to determine a user focus based on at least one of the user position and the user orientation wherein the user orientation is an orientation of at least one body part of the user, and the computing device further comprises a tiling module to operate on the at least one processor to divide frames of the data stream into a plurality of tiles, determine a tile of interest of the plurality of tiles based on the user focus, wherein the virtual display engine is to determine the virtual resolution to include a first virtual resolution for the tile of interest and a second virtual resolution for the other tiles of the plurality of tiles, and wherein the content access module is to enable the computing device to provide the first virtual resolution and the second virtual resolution to the content provider, and receive, from the content provider, the tile of interest encoded according to the first virtual resolution and the other tiles encoded according to the second virtual resolution.

Example 15 may include at least one non-transitory computer-readable medium including instructions to cause a computing device, in response to execution of the instructions by the computing device, to determine a virtual resolution based at least in part on an absolute resolution of a display device associated with the computing device and a relative display size of the display device, wherein the relative display size is based on a user position and an absolute display size of the display device, wherein the user position is a position of a user of the computing device relative to a position of the display device, and the absolute resolution is based on the absolute display size; receive, from a content provider, a data stream segment of a data stream encoded at a bitrate based at least in part on the virtual resolution; and provide the data stream segment for display on the display device.

Example 16 may include the at least one non-transitory computer-readable medium of any of the preceding examples, and/or any of the examples described herein, wherein the instructions cause the computing device, in response to execution of the instructions by the computing device, to adjust the virtual resolution according to one or more user preferences such that the computing device is to select the bitrate for the data stream segment based further on the one or more user preferences.

Example 17 may include the at least one non-transitory computer-readable medium of any of the preceding examples, and/or any of the examples described herein, wherein the instructions cause the computing device, in response to execution of the instructions by the computing device, to determine a current bandwidth allocated to the computing device, and select a bitrate for a next data stream segment of the data stream based further on the current bandwidth.

Example 18 may include the at least one non-transitory computer-readable medium of any of the preceding examples, and/or any of the examples described herein, wherein the instructions cause the computing device, in response to execution of the instructions by the computing device, to determine one or more device attributes of the computing device, wherein the device attributes indicate one or more sensors associated with the computing device; and control the one or more sensors to determine the user position.

Example 19 may include the at least one non-transitory computer-readable medium of any of the preceding examples, and/or any of the examples described herein, wherein the instructions cause the computing device, in response to execution of the instructions by the computing device, to obtain the user position; determine whether the user is within a viewing area based on the user position and the absolute display size, wherein the viewing area is a region in which a display area of the display device is observable; determine the virtual resolution to be a minimum acceptable resolution when the user is determined to be outside of the viewing area; and determine the virtual resolution based on the user position when the user is determined to be within the viewing area.

Example 20 may include the at least one non-transitory computer-readable medium of any of the preceding examples, and/or any of the examples described herein, wherein the instructions cause the computing device, in response to execution of the instructions by the computing device, to control the one or more sensors to obtain a viewing direction wherein the viewing direction is an angle of the user relative to the display device, and obtain one or more gestures of the user; and determine a user focus based on the user position, the viewing angle, and the one or more gestures, and determine the virtual resolution based on the user focus, wherein the user focus indicates an amount of attention being paid to data stream segments of the data stream such that the virtual resolution is decreased as the amount of attention is decreased and the virtual resolution is increased as the amount of attention is increased.

Example 21 may include the at least one non-transitory computer-readable medium of any of the preceding examples, and/or any of the examples described herein, wherein the instructions cause the computing device, in response to execution of the instructions by the computing device, to control the one or more sensors to determine a number of users consuming the data stream; determine the virtual resolution to be the absolute resolution when the number of users consuming the data stream is determined to be greater than one; and determine the virtual resolution based on the user focus when the number of users consuming the data stream is determined to be equal to one.

Example 22 may include the at least one non-transitory computer-readable medium of any of the preceding examples, and/or any of the examples described herein, wherein the instructions cause the computing device, in response to execution of the instructions by the computing device, to determine one or more user attributes associated with the computing device; and determine the virtual resolution based on the one or more user attributes.

Example 23 may include the at least one non-transitory computer-readable medium of any of the preceding examples, and/or any of the examples described herein, wherein the one or more user attributes define a plurality of desired resolutions for each of a plurality of content types, each of a plurality of device types, and one or more device locations, and wherein the instructions cause the computing device, in response to execution of the instructions by the computing device, to determine the virtual resolution to be one of the plurality of desired resolutions according to a content type of the data stream, a device type of the display device or the computing device, and a location of the display device or the computing device.

Example 24 may include the at least one non-transitory computer-readable medium of any of the preceding examples, and/or any of the examples described herein, wherein the one or more user attributes define a first desired resolution and a second desired resolution, wherein the first desired resolution is greater than the second desired resolution, and wherein the instructions cause the computing device, in response to execution of the instructions by the computing device, to control the one or more sensors to determine a user orientation, wherein the user orientation is an orientation of at least one body part of the user; determine a user focus based on the user position and the user orientation; determine the virtual resolution to be the first desired resolution when the user focus is greater than or equal to a focus threshold; and determine the virtual resolution to be the second desired resolution when the user focus is less than the focus threshold.

Example 25 may include the at least one non-transitory computer-readable medium of any of the preceding examples, and/or any of the examples described herein, wherein the one or more user attributes define a subscription associated with the user, and wherein the instructions cause the computing device, in response to execution of the instructions by the computing device, to obtain subscription information indicating an available data usage associated with the subscription; determine the virtual resolution according to the subscription information such that the virtual resolution is decreased as the available data usage is decreased and the virtual resolution is increased as the available data usage is increased.

Example 26 may include the at least one non-transitory computer-readable medium of any of the preceding examples, and/or any of the examples described herein, wherein the one or more user attributes indicate a plurality of other computing devices associated with the user wherein at least one of the plurality of other computing devices are associated with a corresponding subscription, and wherein the instructions cause the computing device, in response to execution of the instructions by the computing device, to obtain subscription information for each of the plurality of other computing devices indicating an available data usage associated with the corresponding subscription; and determine the virtual resolution according to the subscription information such that the virtual resolution is decreased as the available data usage is decreased and the virtual resolution is increased as the available data usage is increased.

Example 27 may include the at least one non-transitory computer-readable medium of any of the preceding examples, and/or any of the examples described herein, wherein the device attributes further indicate one or more internal components of the computing device, and wherein the instructions cause the computing device, in response to execution of the instructions by the computing device, to instruct the one or more internal components to adjust a mode of operation according to the virtual resolution.

Example 28 may include the at least one non-transitory computer-readable medium of any of the preceding examples, and/or any of the examples described herein, wherein the instructions cause the computing device, in response to execution of the instructions by the computing device, to control the one or more sensors to determine the user position and a user orientation wherein the user orientation is an orientation of at least one body part of the user; determine a user focus based on at least one of the user position and the user orientation; divide frames of the data stream into a plurality of tiles; determine a tile of interest of the plurality of tiles based on the user focus; determine the virtual resolution to include a first virtual resolution for the tile of interest and a second virtual resolution for the other tiles of the plurality of tiles; provide the first virtual resolution and the second virtual resolution to the content provider; and receive, from the content provider, the tile of interest encoded according to the first virtual resolution and the other tiles encoded according to the second virtual resolution.

Example 29 may include a computer-implemented method for adaptive data streaming based on a virtual resolution. The method may comprise determining the virtual resolution based at least in part on an absolute resolution of a display device associated with the computing device and a relative display size of the display device, wherein the relative display size is based on a user position and an absolute display size of the display device, wherein the user position is a position of a user of the computing device relative to a position of the display device, and the absolute resolution is based on the absolute display size; receiving, from a content provider, a data stream segment of a data stream encoded at a bitrate based at least in part on the virtual resolution; and providing the data stream segment for display on the display device.

Example 30 may include the computer-implemented method of the preceding example, and/or any of the examples described herein, further comprising adjusting the virtual resolution according to one or more user preferences such that the computing device is to select the bitrate for the data stream segment based further on the one or more user preferences.

Example 31 may include the computer-implemented method of the preceding example, and/or any of the examples described herein, further comprising determining a current bandwidth allocated to the computing device, and select a bitrate for a next data stream segment of the data stream based further on the current bandwidth.

Example 32 may include the computer-implemented method of the preceding example, and/or any of the examples described herein, further comprising determining one or more device attributes of the computing device, wherein the device attributes indicate one or more sensors associated with the computing device; and controlling the one or more sensors to determine the user position.

Example 33 may include the computer-implemented method of the preceding example, and/or any of the examples described herein, further comprising obtaining the user position; determining whether the user is within a viewing area based on the user position and the absolute display size, wherein the viewing area is a region in which a display area of the display device is observable; determining the virtual resolution to be a minimum acceptable resolution when the user is determined to be outside of the viewing area; and determining the virtual resolution based on the user position when the user is determined to be within the viewing area.

Example 34 may include the computer-implemented method of the preceding example, and/or any of the examples described herein, further comprising controlling the one or more sensors to obtain a viewing direction wherein the viewing direction is an angle of the user relative to the display device, and obtain one or more gestures of the user; and determining a user focus based on the user position, the viewing angle, and the one or more gestures, and determine the virtual resolution based on the user focus, wherein the user focus indicates an amount of attention being paid to data stream segments of the data stream such that the virtual resolution is decreased as the amount of attention is decreased and the virtual resolution is increased as the amount of attention is increased.

Example 35 may include the computer-implemented method of the preceding example, and/or any of the examples described herein, wherein controlling the one or more sensors to determine a number of users consuming the data stream; determining the virtual resolution to be the absolute resolution when the number of users consuming the data stream is determined to be greater than one; and determining the virtual resolution based on the user focus when the number of users consuming the data stream is determined to be equal to one.

Example 36 may include the computer-implemented method of the preceding example, and/or any of the examples described herein, further comprising determining one or more user attributes associated with the computing device; and determining the virtual resolution based on the one or more user attributes.

Example 37 may include the computer-implemented method of the preceding example, and/or any of the examples described herein, wherein the one or more user attributes define a plurality of desired resolutions for each of a plurality of content types, each of a plurality of device types, and one or more device locations, and the method further comprises determining the virtual resolution to be one of the plurality of desired resolutions according to a content type of the data stream, a device type of the display device or the computing device, and a location of the display device or the computing device.

Example 38 may include the computer-implemented method of the preceding example, and/or any of the examples described herein, wherein the one or more user attributes define a first desired resolution and a second desired resolution, wherein the first desired resolution is greater than the second desired resolution, and the method further comprises controlling the one or more sensors to determine a user orientation, wherein the user orientation is an orientation of at least one body part of the user; determining a user focus based on the user position and the user orientation; determining the virtual resolution to be the first desired resolution when the user focus is greater than or equal to a focus threshold; and determining the virtual resolution to be the second desired resolution when the user focus is less than the focus threshold.

Example 39 may include the computer-implemented method of the preceding example, and/or any of the examples described herein, wherein the one or more user attributes define a subscription associated with the user, and the method further comprises obtaining subscription information indicating an available data usage associated with the subscription; and determining the virtual resolution according to the subscription information such that the virtual resolution is decreased as the available data usage is decreased and the virtual resolution is increased as the available data usage is increased.

Example 40 may include the computer-implemented method of the preceding example, and/or any of the examples described herein, wherein the one or more user attributes indicate a plurality of other computing devices associated with the user wherein at least one of the plurality of other computing devices are associated with a corresponding subscription, and the method further comprises obtaining subscription information for each of the plurality of other computing devices indicating an available data usage associated with the corresponding subscription; and determining the virtual resolution according to the subscription information such that the virtual resolution is decreased as the available data usage is decreased and the virtual resolution is increased as the available data usage is increased.

Example 41 may include the computer-implemented method of the preceding example, and/or any of the examples described herein, wherein the device attributes further indicate one or more internal components of the computing device, and the method further comprises instructing the one or more internal components to adjust a mode of operation according to the virtual resolution.

Example 42 may include the computer-implemented method of the preceding example, and/or any of the examples described herein, further comprising controlling the one or more sensors to determine the user position and a user orientation wherein the user orientation is an orientation of at least one body part of the user; determining a user focus based on at least one of the user position and the user orientation; dividing frames of the data stream into a plurality of tiles; determining a tile of interest of the plurality of tiles based on the user focus; determining the virtual resolution to include a first virtual resolution for the tile of interest and a second virtual resolution for the other tiles of the plurality of tiles; provide the first virtual resolution and the second virtual resolution to the content provider; and receiving, from the content provider, the tile of interest encoded according to the first virtual resolution and the other tiles encoded according to the second virtual resolution.

Example 43 may include at least one non-transitory computer-readable medium including instructions to cause a computing device, in response to execution of the instructions by the computing device, to perform the method of any of the preceding examples.

Example 44 may include computing device comprising a first means to determine a virtual resolution based at least in part on an absolute resolution of a display device associated with the computing device and a relative display size of the display device, wherein the relative display size is based on a user position and an absolute display size of the display device, wherein the user position is a position of a user of the computing device relative to a position of the display device, and the absolute resolution is based on the absolute display size; a second means to receive, from a content provider, a data stream segment of a data stream encoded at a bitrate based at least in part on the virtual resolution; and a third means to provide the data stream segment for display on the display device.

Example 45 may include the computing device of the preceding example, and/or any of the examples described herein, wherein the first means is to adjust the virtual resolution according to one or more user preferences such that the second means is to select the bitrate for the data stream segment based further on the one or more user preferences.

Example 46 may include the computing device of any of the preceding examples, and/or any of the examples described herein, wherein the second means is to determine a current bandwidth allocated to the computing device, and select a bitrate for a next data stream segment of the data stream based further on the current bandwidth.

Example 47 may include the computing device of any of the preceding examples, and/or any of the examples described herein, further comprising a fourth means to determine one or more device attributes of the computing device, wherein the device attributes indicate one or more sensors associated with the computing device; and a fifth means to operate on the at least one processor to control the one or more sensors to determine the user position.

Example 48 may include the computing device of any of the preceding examples, and/or any of the examples described herein, wherein the first means is to obtain the user position from the fifth means, determine whether the user is within a viewing area based on the user position and the absolute display size wherein the viewing area is a region in which a display area of the display device is observable, determine the virtual resolution to be a minimum acceptable resolution when the user is determined to be outside of the viewing area, and determine the virtual resolution based on the user position when the user is determined to be within the viewing area.

Example 49 may include the computing device of any of the preceding examples, and/or any of the examples described herein, wherein the fifth means is to control the one or more sensors to obtain a viewing direction wherein the viewing direction is an angle of the user relative to the display device, and obtain one or more gestures of the user; and the first means is to determine a user focus based on the user position, the viewing angle, and the one or more gestures, and determine the virtual resolution based on the user focus, wherein the user focus indicates an amount of attention being paid to data stream segments of the data stream such that the virtual resolution is decreased as the amount of attention is decreased and the virtual resolution is increased as the amount of attention is increased.

Example 50 may include the computing device of any of the preceding examples, and/or any of the examples described herein, wherein the fifth means is to control the one or more sensors to determine a number of users consuming the data stream; when the number of users consuming the data stream is determined to be greater than one, the first means is to determine the virtual resolution to be the absolute resolution; and when the number of users consuming the data stream is determined to be equal to one, the first means is to determine the virtual resolution based on the user focus.

Example 51 may include the computing device of any of the preceding examples, and/or any of the examples described herein, further comprising a sixth means to operate on the at least one processor to determine one or more user attributes associated with the computing device, wherein the first means is to obtain the one or more user attributes from the sixth means and determine the virtual resolution based on the one or more user attributes.

Example 52 may include the computing device of any of the preceding examples, and/or any of the examples described herein, wherein the one or more user attributes define a plurality of desired resolutions for each of a plurality of content types, each of a plurality of device types, and one or more device locations, and the first means is to determine the virtual resolution to be one of the plurality of desired resolutions according to a content type of the data stream, a device type of the display device or the computing device, and a location of the display device or the computing device.

Example 53 may include the computing device of any of the preceding examples, and/or any of the examples described herein, wherein the one or more user attributes define a first desired resolution and a second desired resolution, wherein the first desired resolution is greater than the second desired resolution, the fifth means is to control the one or more sensors to determine a user orientation, wherein the user orientation is an orientation of at least one body part of the user, and the first means is to obtain the user position and the user orientation from the fifth means, determine a user focus based on the user position and the user orientation, determine the virtual resolution to be the first desired resolution when the user focus is greater than or equal to a focus threshold, and determine the virtual resolution to be the second desired resolution when the user focus is less than the focus threshold.

Example 54 may include the computing device of any of the preceding examples, and/or any of the examples described herein, wherein the one or more user attributes define a subscription associated with the user, and the sixth means is to obtain subscription information indicating an available data usage associated with the subscription, and the first means is to obtain the subscription information from the sixth means, and determine the virtual resolution according to the subscription information such that the virtual resolution is decreased as the available data usage is decreased and the virtual resolution is increased as the available data usage is increased.

Example 55 may include the computing device of any of the preceding examples, and/or any of the examples described herein, wherein the one or more user attributes indicate a plurality of other computing devices associated with the user wherein at least one of the plurality of other computing devices are associated with a corresponding subscription, and the sixth means is to obtain subscription information for each of the plurality of other computing devices indicating an available data usage associated with the corresponding subscription, and the first means is to obtain the subscription information for each of the plurality of other computing devices from the sixth means, and determine the virtual resolution according to the subscription information such that the virtual resolution is decreased as the available data usage is decreased and the virtual resolution is increased as the available data usage is increased.

Example 56 may include the computing device of any of the preceding examples, and/or any of the examples described herein, wherein the device attributes further indicate one or more internal components of the computing device, and the first means is to instruct the one or more internal components to adjust a mode of operation according to the virtual resolution.

Example 57 may include the computing device of any of the preceding examples, and/or any of the examples described herein, wherein the fifth means is to control the one or more sensors to obtain the user position and a user orientation, and the first means is to determine a user focus based on at least one of the user position and the user orientation wherein the user orientation is an orientation of at least one body part of the user, and the computing device further comprises a seventh means to divide frames of the data stream into a plurality of tiles, determine a tile of interest of the plurality of tiles based on the user focus, wherein the first means is to determine the virtual resolution to include a first virtual resolution for the tile of interest and a second virtual resolution for the other tiles of the plurality of tiles, and wherein the second means is to enable the computing device to provide the first virtual resolution and the second virtual resolution to the content provider, and receive, from the content provider, the tile of interest encoded according to the first virtual resolution and the other tiles encoded according to the second virtual resolution.

Example 58 may include a system comprising an application server; a display device; and a computing device. The computing device may comprise at least one processor; a virtual display engine to operate on the at least one processor to determine a virtual resolution based at least in part on an absolute resolution of a display device associated with the computing device and a relative display size of the display device, wherein the relative display size is based on a user position and an absolute display size of the display device, wherein the user position is a position of a user of the computing device relative to a position of the display device, and the absolute resolution is based on the absolute display size; a content access module to operate on the at least one processor to receive, from the application server, a data stream segment of a data stream encoded at a bitrate based at least in part on the virtual resolution; and a display module to operate on the at least one processor to provide the data stream segment for display on the display device.

Example 59 may include the system of the preceding example, and/or any of the examples described herein, wherein the virtual display engine is to adjust the virtual resolution according to one or more user preferences such that the content access module is to select the bitrate for the data stream segment based further on the one or more user preferences.

Example 60 may include the system of any of the preceding examples, and/or any of the examples described herein, wherein the content access module is to determine a current bandwidth allocated to the computing device, and select a bitrate for a next data stream segment of the data stream based further on the current bandwidth.

Example 61 may include the system of any of the preceding examples, and/or any of the examples described herein, further comprising one or more sensors associated with the computing device, wherein the computing device further comprises: a device attribute module to operate on the at least one processor to determine one or more device attributes of the computing device, wherein the device attributes indicate the one or more sensors associated with the computing device; and a device interface module to operate on the at least one processor to control the one or more sensors to determine the user position.

Example 62 may include the system of any of the preceding examples, and/or any of the examples described herein, wherein the virtual display engine is to obtain the user position from the device interface module, determine whether the user is within a viewing area based on the user position and the absolute display size wherein the viewing area is a region in which a display area of the display device is observable, determine the virtual resolution to be a minimum acceptable resolution when the user is determined to be outside of the viewing area, and determine the virtual resolution based on the user position when the user is determined to be within the viewing area.

Example 63 may include the system of any of the preceding examples, and/or any of the examples described herein, wherein the device interface module is to control the one or more sensors to obtain a viewing direction wherein the viewing direction is an angle of the user relative to the display device, and obtain one or more gestures of the user; and the virtual display engine is to determine a user focus based on the user position, the viewing angle, and the one or more gestures, and determine the virtual resolution based on the user focus, wherein the user focus indicates an amount of attention being paid to data stream segments of the data stream such that the virtual resolution is decreased as the amount of attention is decreased and the virtual resolution is increased as the amount of attention is increased.

Example 64 may include the system of any of the preceding examples, and/or any of the examples described herein, wherein the device interface module is to control the one or more sensors to determine a number of users consuming the data stream, when the number of users consuming the data stream is determined to be greater than one, the virtual display engine is to determine the virtual resolution to be the absolute resolution, and when the number of users consuming the data stream is determined to be equal to one, the virtual display engine is to determine the virtual resolution based on the user focus.

Example 65 may include the system of any of the preceding examples, and/or any of the examples described herein, wherein the computing device further comprises a user attribute module to operate on the at least one processor to determine one or more user attributes associated with the computing device, wherein the virtual display engine is to obtain the one or more user attributes from the user attribute module and determine the virtual resolution based on the one or more user attributes.

Example 66 may include the system of any of the preceding examples, and/or any of the examples described herein, wherein the one or more user attributes define a plurality of desired resolutions for each of a plurality of content types, each of a plurality of device types, and one or more device locations, and the virtual display engine is to determine the virtual resolution to be one of the plurality of desired resolutions according to a content type of the data stream, a device type of the display device or the computing device, and a location of the display device or the computing device.

Example 67 may include the system of any of the preceding examples, and/or any of the examples described herein, wherein the one or more user attributes define a first desired resolution and a second desired resolution, wherein the first desired resolution is greater than the second desired resolution, the device interface module is to control the one or more sensors to determine a user orientation, wherein the user orientation is an orientation of at least one body part of the user, and the virtual display engine is to obtain the user position and the user orientation from the device interface module, determine a user focus based on the user position and the user orientation, determine the virtual resolution to be the first desired resolution when the user focus is greater than or equal to a focus threshold, and determine the virtual resolution to be the second desired resolution when the user focus is less than the focus threshold.

Example 68 may include the system of any of the preceding examples, and/or any of the examples described herein, wherein the one or more user attributes define a subscription associated with the user, and the user attribute module is to obtain subscription information indicating an available data usage associated with the subscription, and the virtual display engine is to obtain the subscription information from the user attribute module, and determine the virtual resolution according to the subscription information such that the virtual resolution is decreased as the available data usage is decreased and the virtual resolution is increased as the available data usage is increased.

Example 69 may include the system of any of the preceding examples, and/or any of the examples described herein, wherein the one or more user attributes indicate a plurality of other computing devices associated with the user wherein at least one of the plurality of other computing devices are associated with a corresponding subscription, and the user attribute module is to obtain subscription information for each of the plurality of other computing devices indicating an available data usage associated with the corresponding subscription, and the virtual display engine is to obtain the subscription information for each of the plurality of other computing devices from the user attribute module, and determine the virtual resolution according to the subscription information such that the virtual resolution is decreased as the available data usage is decreased and the virtual resolution is increased as the available data usage is increased.

Example 70 may include the system of any of the preceding examples, and/or any of the examples described herein, wherein the device attributes further indicate one or more internal components of the computing device, and the virtual display engine is to instruct the one or more internal components to adjust a mode of operation according to the virtual resolution.

Example 71 may include the system of any of the preceding examples, and/or any of the examples described herein, wherein the device interface module is to control the one or more sensors to obtain the user position and a user orientation, and the virtual display engine is to determine a user focus based on at least one of the user position and the user orientation wherein the user orientation is an orientation of at least one body part of the user, and the computing device further comprises a tiling module to operate on the at least one processor to divide frames of the data stream into a plurality of tiles, determine a tile of interest of the plurality of tiles based on the user focus, wherein the virtual display engine is to determine the virtual resolution to include a first virtual resolution for the tile of interest and a second virtual resolution for the other tiles of the plurality of tiles, and wherein the content access module is to enable the computing device to provide the first virtual resolution and the second virtual resolution to the application server, and receive, from the application server, the tile of interest encoded according to the first virtual resolution and the other tiles encoded according to the second virtual resolution.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

We claim:

1. A computer system comprising:
 input/output (I/O) interface circuitry to couple the computer system to a display device and sensor circuitry;
 network interface circuitry (NIC); and
 processor circuitry coupled with memory circuitry, and communicatively coupled with the I/O interface circuitry and the network interface circuitry, wherein the processor circuitry is to:

determine user contexts based on data representative of a user position, data representative of surrounding environmental factors, data representative of a user gesture, and data representative of one or more device attributes, each of which is obtained from the sensor circuitry via the I/O interface circuitry, wherein the user position is a position of a user of the computer system relative to a position of the display device and indicative of a viewing distance, the user gesture is an orientation of one or more body parts of the user, the surrounding environmental factors include information regarding ambient lighting and background noise of an environment in which content is to be consumed, and wherein the one or more device attributes include attributes of one or more internal components of the computer system or one or more external components of the computer system, determine a relative resolution of the display device based on the user contexts, wherein, to determine the relative resolution, the processor circuitry is to decrease the relative resolution as the viewing distance increases, determine a virtual resolution based on the relative resolution, the determined user contexts, a desired resolution defined for a content type of a data stream to be consumed, a device type of the display device or the computer system, and a location of the display device or the computer system, adjust the virtual resolution based on the surrounding environmental factors, the user gesture, and the one or more device attributes, wherein, to adjust the virtual resolution, the processor circuitry is to: determine a user focus level based on the surrounding environmental factors, the user gesture, and the one or more device attributes, wherein the user focus level indicates an amount of attention being paid to data stream segments of the data stream, and decrease the virtual resolution when the user focus level is less than a focus threshold, control the NIC to send, to a content provider, a request for a data stream segment of the data stream at a bitrate according to the virtual resolution, control the NIC to receive, from a content provider, the data stream segment of the data stream encoded at the requested bitrate, and provide the data stream segment to the display device for display on the display device.

2. The computer system of claim 1, wherein the processor circuitry is to adjust the virtual resolution according to one or more user preferences such that the processor circuitry is to select the bitrate for the data stream segment based further on the one or more user preferences.

3. The computer system of claim 1, wherein the processor circuitry is to:
determine a current bandwidth allocated to the computer system, and
adjust the virtual resolution according to the current bandwidth allocation.

4. The computer system of claim 1, wherein the processor circuitry is to:
control the sensor circuitry to capture first sensor data including the data representative of the user position and the data representative of the user gesture;
control the sensor circuitry to capture second sensor data including the data representative of the surrounding environmental factors;
control receipt of one or more device attributes of the one or more internal components from the one or more internal components via the I/O interface circuitry; and
control receipt of one or more device attributes of the one or more external components from the one or more external components via the I/O interface circuitry or via communication circuitry of the computer system.

5. The computer system of claim 4, wherein the processor circuitry is to:
determine an absolute resolution of the display device to be a ratio of a number of distinct pixels in a horizontal dimension of the display device and a number of distinct pixels in a vertical dimension of the display device;
determine whether the user is within a viewing area based on the determined user position and the absolute resolution, wherein the viewing area is a region in which a display area of the display device is observable;
set the virtual resolution to be a minimum acceptable resolution when the user is determined to be outside of the viewing area; and
set the virtual resolution based on the user position when the user is determined to be within the viewing area.

6. The computer system of claim 4, wherein the processor circuitry is to:
determine a viewing direction based on the determined user position and the determined user gesture, wherein the viewing direction is an angle of the user relative to the display device, and obtain one or more gestures of the user; and
determine the user focus level based on the user position and the viewing angle,
decrease the virtual resolution when the user focus level is less than the focus threshold, and
increase the virtual resolution when the user focus level is greater than or equal to the focus threshold.

7. The computer system of claim 6, wherein the processor circuitry is to:
control the sensor circuitry to capture data representative of a number of users consuming the data stream;
set the virtual resolution to be the absolute resolution when the number of users consuming the data stream is greater than one, and
set the virtual resolution based on the user focus level as compared to the focus threshold when the number of users consuming the data stream is one.

8. The computer system of claim 4, wherein the processor circuitry is to:
determine one or more user attributes from one or more applications running on or stored by the computer system, wherein the one or more user attributes define a plurality of desired resolutions for each of a plurality of content types, each of a plurality of computer system types, one or more computer system positions and/or locations, one or more computer system orientations, one or more computer system movement velocities and/or accelerations, and/or one or more gestures or body movements; and
set the virtual resolution to be a desired resolution defined by the one or more user attributes.

9. The computer system of claim 8, wherein the one or more user attributes define a first desired resolution and a second desired resolution, wherein the first desired resolution is greater than the second desired resolution, and the processor circuitry is to:

determine the virtual resolution to be the first desired resolution when the user focus level is greater than or equal to the focus threshold; and set the virtual resolution to be the second desired resolution when the user focus level is less than the focus threshold.

10. The computer system of claim 8, wherein the one or more user attributes define a subscription associated with the user, and the processor circuitry is to:

obtain subscription information indicating an available data usage associated with the subscription;

decrease the virtual resolution according to the subscription information such that the virtual resolution as the available data usage is decreased; and increase the virtual resolution as the available data usage is increased.

11. The computer system of claim 10, wherein the one or more user attributes indicate a plurality of other computer devices associated with the user wherein at least one of the plurality of other computer devices are associated with a corresponding subscription, and the processor circuitry is to:

obtain subscription information for each of the plurality of other computer devices indicating an available data usage associated with the corresponding subscription;

decrease the virtual resolution as the available data usage is decreased for individual other computer devices of the plurality of other computer devices; and increase the virtual resolution as the available data usage is increased for individual other computer devices of the plurality of other computer devices.

12. The computer system of claim 4, wherein the processor circuitry is to instruct the one or more internal components to adjust a mode of operation based on the virtual resolution.

13. The computer system of claim 4, wherein the processor circuitry is to:

divide frames of the data stream into a plurality of tiles;

determine a user focus region based on the user position and the user gesture;

determine a tile of interest of the plurality of tiles based on the user focus region;

determine a first virtual resolution for the tile of interest and a second virtual resolution for other tiles of the plurality of tiles;

control the network interface circuitry to provide the first virtual resolution and the second virtual resolution to the content provider; and control the network interface circuitry to receive, from the content provider, the tile of interest encoded according to the first virtual resolution and the other tiles encoded according to the second virtual resolution.

14. The computer system of claim 1, wherein, to adjust the virtual resolution, the processor circuitry is to:

determine an increase amount and a decrease amount to increase or decrease the virtual resolution, respectively, based on the obtained user contexts.

15. At least one non-transitory computer-readable medium (NTCRM) comprising instructions, wherein execution of the instructions by one or more processors of a computer device is to cause the computer device to:

determine user contexts of a user of the computer device based on data representative of a user position, data representative of surrounding environmental factors, data representative of a user gesture, and data representative of one or more device attributes, wherein the user position is a position of a user relative to a position of a display device and indicative of a viewing distance, the user gesture is an orientation of one or more body parts of the user, the surrounding environmental factors include information regarding ambient lighting and background noise of an environment in which content is to be consumed, and the one or more device attributes include attributes of one or more internal components of the computer device or one or more external components of the computer device;

determine a relative resolution of the display device based on the user contexts, wherein, to determine the relative resolution, execution of the instructions is to cause the computer device to: decrease the relative resolution as the viewing distance increases;

determine a virtual resolution based on the relative resolution, the determined user contexts, a desired resolution defined for a content type of a data stream to be consumed, a device type of the display device or the computer system, and a location of the display device or the computer system;

adjust the virtual resolution based on the surrounding environmental factors, the user gesture, and the one or more device attributes, wherein, to adjust the virtual resolution, execution of the instructions is to cause the computer device to:

determine a user focus level based on the surrounding environmental factors, the user gesture, and the one or more device attributes, wherein the user focus level indicates an amount of attention being paid to data stream segments of the data stream, and decrease the virtual resolution when the user focus level is less than a focus threshold or increase the virtual resolution when the user focus level is greater than or equal to the focus threshold;

control transmission, to a content provider, of a request for a data stream segment of a data stream at a bitrate according to the virtual resolution;

control receipt, from a content provider, of the data stream segment of the data stream encoded at the requested bitrate; and provide the data stream segment to the display device for display on the display device.

16. The at least one NTCRM of claim 15, wherein execution of the instructions is to cause the computer device to:

adjust the virtual resolution according to one or more user preferences such that the bitrate for the data stream segment is selected based further on the one or more user preferences.

17. The at least one NTCRM of claim 15, wherein execution of the instructions is to cause the computer device to:

determine a current bandwidth allocated to the computer device and adjust the virtual resolution according to the current bandwidth allocation.

18. The at least one NTCRM of claim 15, wherein execution of the instructions is to cause the computer device to:

control sensor circuitry to capture first sensor data including the data representative of the user position and the data representative of the user gesture;

control the sensor circuitry to capture second sensor data including the data representative of the surrounding environmental factors;

control receipt of one or more device attributes of the one or more internal components from the one or more internal components via I/O interface circuitry; and control receipt of one or more device attributes of the one or more external components from the one or more external components via the I/O interface circuitry or via communication circuitry of the computer system.

19. The at least one NTCRM of claim 18, wherein execution of the instructions is to cause the computer device to:
   determine a viewing direction based on the determined user position and the determined user gesture, wherein the viewing direction is an angle of the user relative to the display device, and obtain one or more gestures of the user; and
   determine the user focus level based on the user position and the viewing angle;
   decrease the virtual resolution when the user focus level is less than the focus threshold; and,
   increase the virtual resolution when the user focus level is greater than or equal to the focus threshold.

20. The at least one NTCRM of claim 19, wherein execution of the instructions is to cause the computer device to:
   control the sensor circuitry to capture data representative of a number of users consuming the data stream;
   determine the virtual resolution to be the absolute resolution when the number of users consuming the data stream is determined to be greater than one; and
   determine the virtual resolution based on the user focus level when the number of users consuming the data stream is determined to be equal to one.

21. The at least one NTCRM of claim 18, wherein execution of the instructions is to cause the computer device to:
   determine one or more user attributes associated with the computer device, wherein the one or more user attributes define a plurality of desired resolutions for each of a plurality of content types, each of a plurality of computer system types, one or more computer system positions and/or locations, one or more computer system orientations, one or more computer system movement velocities and/or accelerations, and/or one or more gestures or body movements; and
   determine the virtual resolution to be a desired resolution defined by the one or more user attributes.

22. The at least one NTCRM of claim 21, wherein the one or more user attributes define a first desired resolution and a second desired resolution, wherein the first desired resolution is greater than the second desired resolution, and wherein execution of the instructions is to cause the computer device to:
   determine the virtual resolution to be the first desired resolution when the user focus level is greater than or equal to the focus threshold; and
   determine the virtual resolution to be the second desired resolution when the user focus level is less than the focus threshold.

23. The at least one NTCRM of claim 21, wherein the one or more user attributes define a subscription associated with the user, and wherein execution of the instructions is to cause the computer device to:
   obtain subscription information indicating an available data usage associated with the subscription;
   decrease the virtual resolution as the available data usage is decreased; and
   increase the virtual resolution as the available data usage is increased.

24. The at least one NTCRM of claim 23, wherein the one or more user attributes indicate a plurality of other computer devices associated with the user wherein at least one of the plurality of other computer devices are associated with a corresponding subscription, and wherein execution of the instructions is to cause the computer device to:
   obtain subscription information for each of the plurality of other computer devices indicating an available data usage associated with the corresponding subscription;
   decrease the virtual resolution as the available data usage is decreased; and
   increase the virtual resolution as the available data usage is increased.

25. The at least one NTCRM of claim 18, wherein, to adjust the virtual resolution, execution of the instructions is to cause the computer device to:
   determine an increase amount and a decrease amount to increase and decrease the virtual resolution, respectively, based on the obtained user contexts.

26. The at least one NTCRM of claim 15, wherein execution of the instructions is to cause the computer device to:
   determine an absolute resolution of the display device associated with the computer device to be a number of distinct pixels in a horizontal dimension of the display device and a number of distinct pixels in a vertical dimension of the display device;
   determine whether the user is within a viewing area based on the user position and the absolute resolution, wherein the viewing area is a region in which a display area of the display device is observable;
   determine the virtual resolution to be a minimum acceptable resolution when the user is determined to be outside of the viewing area; and
   determine the virtual resolution based on the user position when the user is determined to be within the viewing area.

27. The at least one NTCRM of claim 15, wherein execution of the instructions is to cause the computer device to:
   instruct the one or more internal components to adjust a mode of operation according to the virtual resolution.

28. The at least one NTCRM of claim 15, wherein execution of the instructions is to cause the computer device to:
   determine a user focus region based on the user position and the user orientation;
   divide frames of the data stream into a plurality of tiles;
   determine a tile of interest of the plurality of tiles based on the user focus region;
   determine the virtual resolution to include a first virtual resolution for the tile of interest and a second virtual resolution for other tiles of the plurality of tiles;
   control transmission of the first virtual resolution and the second virtual resolution to the content provider; and
   control receipt, from the content provider, of the tile of interest encoded according to the first virtual resolution and the other tiles encoded according to the second virtual resolution.

* * * * *